(12) United States Patent
Dubief et al.

(10) Patent No.: US 12,408,691 B2
(45) Date of Patent: Sep. 9, 2025

(54) PROCESS OF CALIBRATION OF A ROASTING APPARATUS

(71) Applicant: SOCIETE DES PRODUITS NESTLE S.A., Vevey (CH)

(72) Inventors: Flavien Florent Dubief, Champagne (CH); Nicolas Bigler, Morrens (CH); Riste Pindjurov, Neyruz (CH); Vincent Martin, Orbe (CH)

(73) Assignee: Societe des Produits Nestle S.A., Vevey (CH)

( * ) Notice: Subject to any disclaimer, the term of this patent is extended or adjusted under 35 U.S.C. 154(b) by 444 days.

(21) Appl. No.: 17/997,139

(22) PCT Filed: Apr. 27, 2021

(86) PCT No.: PCT/EP2021/061009
§ 371 (c)(1),
(2) Date: Oct. 26, 2022

(87) PCT Pub. No.: WO2021/219654
PCT Pub. Date: Nov. 4, 2021

(65) Prior Publication Data
US 2023/0180814 A1 Jun. 15, 2023

(30) Foreign Application Priority Data

Apr. 27, 2020 (EP) .................................... 20171665

(51) Int. Cl.
*A23F 5/04* (2006.01)
*A23N 12/12* (2006.01)
(Continued)

(52) U.S. Cl.
CPC .............. *A23N 12/125* (2013.01); *A23F 5/04* (2013.01); *G01K 1/026* (2013.01); *G05D 23/1951* (2013.01)

(58) Field of Classification Search
None
See application file for complete search history.

(56) References Cited

U.S. PATENT DOCUMENTS 6,770,315 B2    8/2004  Moon et al.
10,531,675 B2 * 1/2020  Tan .......................... A47J 31/42
(Continued)

FOREIGN PATENT DOCUMENTS

CN    105636461 A  *  6/2016  ............... A23F 5/04
CN    107260008 A     10/2017
(Continued)

OTHER PUBLICATIONS

Tom G. Proof of Principle Computer Controlled Poppery Coffee Roaster, Aug. 2003, Online: http://home.columbus.rr.com/thegramilas/coffee/roaster.html (Year: 2003).*
(Continued)

*Primary Examiner* — Gregory A Wilson
(74) *Attorney, Agent, or Firm* — K&L Gates LLP

(57) ABSTRACT

The invention concerns process of calibration of a coffee beans roasting apparatus in order to reproduce coffee beans roasting recipes defined with one specific master roasting apparatus, said calibration process comprising the steps of: a—introducing at least one second temporary temperature probe inside the chamber of the roasting apparatus, b—controlling the heating device to reproduce a preset curve R said control being based on the temperature Treg regulated by the at least one first temperature probe, c—during the reproduction of the preset curve Rset, measuring the temperature Tcal in function of time inside the chamber, d—comparing the temperature Tcal@ti with the temperature Tref@ti of a pre-determined calibration curve Rref obtained with the master roasting apparatus (M), said calibration curve Rref representing the temperature Tref measured in the chamber of the specific master apparatus (M) while controlling the (Continued)

heating device of the master apparatus to reproduce said preset curve Rset, e—based on this comparison, calibrating the roasting apparatus by applying a correction, to the temperature Treg regulated by the first temperature probe inside the control system of the roasting apparatus.

17 Claims, 10 Drawing Sheets

(51) Int. Cl.
*G01K 1/02* (2021.01)
*G05D 23/19* (2006.01)

(56) References Cited

U.S. PATENT DOCUMENTS

| | | | |
|---|---|---|---|
| 11,439,156 B2* | 9/2022 | Voges | A23N 12/125 |
| 2006/0266229 A1* | 11/2006 | Ribich | A23N 12/12 |
| | | | 99/486 |
| 2008/0089986 A1 | 4/2008 | Song | |
| 2022/0225656 A1* | 7/2022 | Ceccaroli | A23N 12/08 |

FOREIGN PATENT DOCUMENTS

| | | | | |
|---|---|---|---|---|
| NL | 8301025 A | * | 12/1983 | A23F 5/046 |
| RU | 2692224 C2 | | 6/2019 | |
| WO | 2009039930 A1 | | 4/2009 | |
| WO | 2013108283 A1 | | 7/2013 | |
| WO | 2018021081 A1 | | 2/2018 | |
| WO | 2018053436 | | 3/2018 | |

OTHER PUBLICATIONS

Tom G., Coffee Profile Attempts, Aug. 2003, Online: http://home.columbus.tt.com/thegramilas/coffee/profile.html (Year: 2003).*
Russian Office Action for Appl No. 2022127871/10 dated Aug. 28, 2024, 9 pages.
Chinese Office Action for Appl No. 202180031146.0 dated Sep. 5, 2024, 6 pages.
Japanese Office Action for Appl No. 2022-563950 dated Feb. 4, 2025, 3 pages.

* cited by examiner

PROCESS OF CALIBRATION OF A ROASTING APPARATUS

CROSS REFERENCE TO RELATED APPLICATIONS

The present application is a National Stage of International Application No. PCT/EP2021/061009, filed on Apr. 27, 2021, which claims priority to European Patent Application No. 20171665.1, filed on Apr. 27, 2020, the entire contents of which are being incorporated herein by reference.

FIELD OF THE INVENTION

The present invention relates to coffee beans roasting apparatuses and the method to calibrate such apparatuses.

BACKGROUND OF THE INVENTION

The roasting of coffee beans consists in introducing coffee beans in a roasting chamber and applying heating to said beans.

Generally, the roasting apparatus comprises a chamber to contain coffee beans, a heating device to heat air supplied to the chamber, a temperature probe to regulate the temperature supplied by the heating device and a controller which is in operative communication with the temperature probe and the heating device. The controller operates to activate and deactivate the heating device. The controller has stored therein, a predefined roast profile, which comprises a plurality of data points corresponding to a particular time and temperature. The controller operates on a periodic basis to read a roast control signal value, correlate that roast control signal value with the roast profile, and control the operation of the heating device so as to maintain the temperature of the coffee beans in accordance with the roast profile.

This predefined roast profile is usually defined for a particular type of coffee beans and by a coffee expert. The roast profile is defined to provide the optimal roasting of this type of coffee beans and reproducing this roast profile is a guarantee of not wasting beans.

In order to reproduce this roast profile, it is essential that the roasting apparatus is able to apply exactly the required temperature of the roast profile. This is usually obtained by regulating the temperature inside the roasting chamber itself that is inside the bed of coffee beans. For example, U.S. Pat. No. 6,053,093 provides a roasting apparatus with thermosensors immersed inside the roasting chamber.

Yet, depending on the type of roasting apparatus, it is not always desired or possible to introduce a temperature sensor inside the roasting chamber to measure temperature inside the bed of coffee beans.

First, it is not desirable to have a temperature sensor inside the chamber and the bed of coffee beans because this sensor can rapidly get dirty and provide erroneous measures or require frequent cleaning or maintenance operations. And, if the temperature sensor is positioned in a part of the chamber where it can be protected from dirtiness, that is away from direct contact with beans, the measures are less reliable. Other sensors can be present at the outlet of the chamber yet still outside the chamber like in WO2018021081 or U.S. Pat. No. 6,770,315.

Secondly, in some apparatuses, it is difficult to provide such an inside temperature sensor, in particular in a chamber that has to be removed from the apparatus for the operation of introducing and emptying the beans. Since the temperature needs to be connected to the processing unit of the apparatus, each roasting operation would require the disconnection of the sensor. Unplugging the temperature sensor at each roasting operation would be complex or introduce fragility in the apparatus. In this type of apparatus, it is preferred to regulate the temperature with at least one fixed sensor localised outside the chamber, preferably close to the heating device, that is close to the inlet of hot air inside the chamber.

With this type of roasting apparatus comprising a temperature probe outside the roasting chamber, for each type of beans, a specific roasting profile is defined with a master apparatus. This specific roasting profile defined with the master apparatus corresponds to the temperature of the hot air provided by a heating device and regulated by said at least one temperature probe positioned outside the chamber.

When a series of identical roasting apparatus are manufactured, it has been observed that, even by operating the heating device of each apparatus in order to apply the same roasting profile as defined with the master apparatus based on the regulating of temperature measured with a correctly calibrated temperature probe, roasting the same beans in identical apparatuses was not always consistent: the colour and the aroma of the coffee beans differed. The lack of consistency in reproducing similar roasting profile happened between the new manufactured roasting apparatuses and the master apparatus but also between two roasting apparatuses of the same series.

An object of the present invention is to provide a solution to this problem of consistently roasting the same roasting profile in different roasting apparatuses.

SUMMARY OF THE INVENTION

In a first aspect of the invention, there is provided a calibration process of a coffee beans roasting apparatus (X), in order to reproduce coffee beans roasting recipes defined with one specific master roasting apparatus (M),
said coffee beans roasting apparatus (X) comprising:
- a chamber to contain coffee beans,
- a heating device to heat air supplied to the chamber,
- at least one first temperature probe to regulate the temperature of air supplied by the heating device, said first temperature probe being positioned outside the chamber,
- a control system configured to control the heating device and configured to reproduce roasting curves, said roasting curves providing at least a set of points ($T_{@ti}$; $t_i$) representing the temperature to be applied at discrete successive times $t_i$, respectively, said control of the heating device implementing a feedback loop regulation based on the temperature $T_{reg}$ measured by the at least one first temperature probe (5), said calibration process comprising the steps of:
a—introducing at least one second temporary temperature probe inside the chamber of the roasting apparatus to be calibrated or replacing said chamber by a temporary calibration chamber, said temporary calibration chamber comprising at least one second temperature probe,
b—controlling the heating device to reproduce a preset curve $R_{set}$, said curve providing a set of points ($T_{set@ti}$; $t_i$) representing the temperature $T_{set@t1}$, $T_{set@t2}$, · · · $T_{set@tfinal}$ to be applied at preset corresponding successive times $t_1$, $t_2$, . . . , $t_{final}$ respectively, said control being based on the temperature $T_{reg}$ regulated by the at least one first temperature probe, c—during the reproduction of the preset curve $R_{set}$, measuring the temperature $T_{cal}$ in function of time inside the chamber at the at least one second temperature probe enabling the determination of at least a set of points ($T_{cal@ti}$; $t_i$), d—comparing the temperature $T_{cal@ti}$ measured at least one time $t_i$ with the temperature $T_{ref@ti}$ at said same time $t_i$ of a pre-determined reference curve $R_{ref}$ obtained with the master roasting apparatus (M), said reference curve $R_{ref}$ representing the temperature $T_{ref}$ measured in the chamber of the specific master apparatus (M) while controlling the heating device of the master apparatus to reproduce said preset curve $R_{set}$, e—based on this comparison, calibrating the roasting apparatus (X) by applying a correction to the feedback loop regulation, preferably by applying a correction to the temperature $T_{reg}$ measured by the first temperature probe or by applying a correction to the temperatures $T_{@ti}$ provided by the roasting curves to be reproduced by the roasting apparatus (X).

The process relates to the calibration of a coffee beans roasting apparatus (X) in order to make it consistent in the reproduction of coffee beans roasting recipes that were defined with one specific master roasting apparatus (M). Usually, a roasting recipe is defined for a specific type of coffee beans or a specific blend of different beans by a coffee expert operating one particular roasting apparatus. This roasting apparatus with which the expert has defined the roasting recipes is defined as the master roasting apparatus.

The calibration process aims to enable the consistent reproduction of the coffee beans roasting recipes defined with the specific master roasting apparatus (M) with other apparatuses (X) that are usually manufacturing copies of the specific master roasting apparatus (M).

The process is applied on a coffee beans roasting apparatus comprising at least: a chamber to contain coffee beans, a heating device, at least one first temperature probe to regulate the temperature supplied by the heating device and positioned outside the chamber and a control system.

This roasting apparatus is such that it does not comprise any probe inside the chamber during the operation of roasting coffee beans, in particular any regulating probe. The roasting apparatus can comprise a measuring probe inside the chamber during the calibration process only.

The master apparatus presents the same configuration.

The method can be applied to any type of roasting apparatus such as described above.

The chamber is designed to contain coffee beans during the roasting process. In the chamber, coffee beans are heated and preferably mixed to homogenise heating through the beans. Mixing can be obtained with a fluidic bed of hot air or mechanically with stirring blades or through rotation of a rotating drum.

Preferably the roasting apparatus is hot air fluid bed chamber. Within such a chamber, heated air is forced through a screen or a perforated plate under the coffee beans with sufficient force to lift the beans. Heat is transferred to the beans as they tumble and circulate within this fluidized bed.

Alternatively the roasting apparatus can be a drum chamber wherein the coffee beans are tumbled in a heated environment. The drum chamber can consist of a drum rotating along a horizontal axis or the drum chamber can comprise stirring blades to tumble the coffee beans in a heated environment.

The chamber usually comprises an outlet from which smoke produced during the roasting operation can be evacuated.

The heating device heats air supplied to the chamber in order to heat coffee beans contained in the chamber Preferably, the heating device is configured to produce a flow of hot air, said flow of hot air being directed to the coffee beans contained in the chamber in order to heat them. Usually, the heating device comprises at least an air driver and a heater to heat the flow of air produced by the air driver.

The heating device can comprise a burner (meaning combustion) fed by natural gas, liquefied petroleum gas (LPG) or even wood. Alternatively, the heating device can comprise an electrical resistor, a ceramic heater, a halogen source, a source of infrared and/or a source of microwaves.

Preferably the heating device is electrically powered so that the air contaminants produced during the roasting are contaminants generated from the heating of coffee beans themselves only and not from the burning of gases as it happens when the source of heating is a gas burner using natural gas, propane, liquefied petroleum gas (LPG) or even wood.

The apparatus comprises at least one first temperature probe to regulate the temperature supplied by the heating device. The temperature measured by this probe is used as an input data of the control system in feedback loop control. This first temperature probe is positioned outside the chamber meaning that it does not contact the coffee beans during the roasting operation. Preferably, this first probe is positioned in the apparatus in order to measure the temperature of hot air supplied to the chamber, that is usually between the heating device and the chamber.

In order to improve the accuracy of the measure of hot air supplied to the chamber, the apparatus can comprise at least two first temperature probes. These first probes can be positioned in a conduit configured to drive the flow of hot air from the heating device to the chamber, preferably in a local transversal constriction of said conduit, each probe being positioned at different radial positions in said local transversal constriction.

Optionally, the apparatus can comprise another first probe downstream the chamber. Yet, this position of this probe downstream the chamber is less preferred due to the contact with smoke emitted roasting operation resulting in dirtiness and impact on the accurate measure of temperature.

The control system of the apparatus is operable to control the heating device in order to reproduce roasting curves, said roasting curves providing at least a set of points ($T_{@ti}$; $t_i$) representing the temperature to be applied at discrete successive times $t_i$, respectively. This control of the heating device is based on the implementation of a feedback loop regulation based on the temperature $T_{reg}$ measured by the at least one first temperature probe in a feedback loop control. The feedback loop regulation usually consists in a comparison of the measured temperature $T_{reg}$ with the temperature T to be applied and then, based on the comparison, in controlling the heating device following a pre-defined rule. Such feedback loop regulation is well-known from the state of the art.

If the apparatus comprises more than one first probe, the average value of the measures of all said probes can be used by the control system as the temperature $T_{reg}$ in feedback loop regulation.

In a first step a), the calibration process comprises:
in a first mode: introducing at least one second temporary temperature probe inside the chamber of the roasting apparatus to be calibrated, or in a second mode: replacing said chamber by a temporary calibration chamber, said temporary calibration chamber comprising at least one second temperature probe.

In both modes, the presence of the at least one secondary probe enables the measure $T_{cal}$ of temperature inside the chamber or the temporary chamber during the calibration process.

In both modes, several secondary probes can be introduced. When more than one secondary probe are used, these probes can be positioned at different zones of the chamber.

In the first mode, preferably, the at least one second temporary temperature probe is introduced in order to be positioned in or close to a zone of the chamber where the bed of coffee is present during a roasting operation.

In the second mode, during the calibration process, the chamber of the roasting apparatus is replaced by a similar chamber comprising at least one secondary probe positioned inside, preferably close or in a zone of the chamber where the bed of coffee is present during a roasting operation.

In a further step b), the calibration process comprises controlling the heating device of the apparatus (X) to reproduce a preset curve $R_{set}$, said preset curve providing a set of points $(T_{set@}t_i; t_i)$ representing the temperature $T_{set@}t_1, T_{set@}t_2, \ldots T_{set@}t_{final}$ to be applied at predefined corresponding successive times $t_1, t_2, \ldots, t_{final}$ respectively, said control being based on the temperature $T_{reg}$ regulated by the at least one first temperature probe.

During the reproduction of the preset curve $R_{set}$, in a simultaneous step c), the calibration process comprises measuring the temperature $T_{cal}$ inside the chamber at the at least one second temperature probe in function of time. Accordingly, this step c) enables the determination of at least a set of points $(T_{cal}@t_i; t_i)$.

In a step d), the calibration process comprises comparing the temperature $T_{cal}@t_i$ measured at least one time $t_i$ with the temperature $T_{ref@}t_i$ at said same time $t_i$ of a pre-determined reference curve $R_{ref}$ obtained with the master roasting apparatus (M). This calibration curve $R_{ref}$ represents the temperature $T_{ref}$ measured in the chamber of the master apparatus (M) while controlling the heating device of the master apparatus to reproduce the same preset curve $R_{set}$.

As further described below, this step d) can be implemented after or simultaneously to steps b) and c).

Then, in a step e), based on the comparison resulting from step d), the calibration process comprises calibrating the roasting apparatus (X) by applying a correction to the feedback loop regulation. Preferably, this correction is applied:

to the measured temperature $T_{reg}$ in the control system of the apparatus (X). Here, it is meant that, in the control system, the value of the temperature measured by the at least one first probe is corrected, based on the comparison established in step d), in the feedback loop regulation of the heating device.

or to the temperatures $T_{@ti}$ provided by the roasting curves to be reproduced inside the control system of the roasting apparatus. Here, it is meant that, in the control system, the value of the temperature to be reproduced by the heating device is corrected, based on the comparison established in step d), in the feedback loop regulation of the heating device.

Depending on the type of apparatus, the type of heating (such as variation of heater only or fan only or both fan and heater), the correction can be a multiplication factor, the combination of a multiplication factor and an offset, a correction based on a polynomial formula, a correction based on a log type formula or an offset only. Usually, the correction can be determined via well-known mathematical regression methods establishing relationship between $T_{cal@ti}$ and $T_{ref@ti}$.

In one embodiment of the calibration process:
step d) happens simultaneously to step c), and
in step c), during the reproduction of the preset curve $R_{set}$, at predefined times $t_{ref\,i}$, corresponding temperatures $T_{ref@tref\,i}$ sand $T_{cal@tref\,i}$ are compared and a correction is immediately applied to the feedback loop regulation, preferably a correction is applied to the temperature $T_{reg}$ regulated by the first temperate probe or a correction is applied to the temperatures $T_{set@ti}$ provided by the preset curve $R_{set}$, in step e), based on the last correction in step c), the roasting apparatus (X) is calibrated by applying said last correction to the feedback loop regulation, preferably by applying said last correction to the temperature $T_{reg}$ measured by the first temperature probe or by applying said last correction to the temperatures $T_{@ti}$ provided by the roasting curves to be reproduced by the roasting apparatus (X).

Preferably, in the calibration process, between step c) and step d):

the value of the temperature $T_{cal@ti}$ measured at the at least one second temperature probe at step c) can be adjusted to an adjusted value $T_{cal@ti-adjusted}$, said adjusted value depending on the second temperature probe introduced inside the chamber of the roasting apparatus to be calibrated or on the temporary calibration chamber replacing the chamber of the roasting apparatus to be calibrated, and in step d) this adjusted value $T_{cal@ti-adjusted}$ can be compared with the temperature $T_{ref@ti}$.

It has been observed that by introducing different second temperature probes inside the roasting chamber and operating the calibration process with each of said different second temperature probes, different corrections of the feedback loop of the roasting apparatus were obtained. Indeed although the differences in the measures of the different probes were very small, a difference of a few degrees, these differences directly impacted the calibration process. Actually it is known that a difference of a few Celsius degrees directly impacts the final colour of the roasted beans by several CTN values (color test Neuhaus) and obviously the taste of the final roasted coffee beans. In an objective to reproduce as close as possible the roasting profile applied in the master apparatus, these differences of measures are preferably taken into account during the calibration process.

These differences can be related to the position of the second temperature probe inside the temporary calibration chamber, to small differences of mechanical construction of the temporary calibration chambers due to lack of assembly accuracy, production line variance, component variance, component ageing.

Usually, this adjustment is pre-determined in a previous operation of calibration of the second temporary temperature probe itself. This calibration of the second temporary temperature probe is realised by comparison with an already adjusted probe.

Different types of adjustment can be applied depending on the relationship between the temperatures of the two probes.

In one preferred process:

$$T_{cal@ti-adjusted} = K_{2probe} \cdot (T_{cal@ti})^2 + K_{1probe} \cdot T_{cal@ti} + T_{probe}$$

wherein:

$T_{probe}$ corresponds to a preset temperature offset, said preset temperature offset being specifically pre-determined for the at least one second temporary temperature probe introduced inside the chamber of the roasting apparatus to be calibrated or for the temporary calibration chamber replacing the chamber of the roasting apparatus to be calibrated, or is equal to 0 by default, $K_{1probe}$ and corresponds to a preset temperature ratio, said preset temperature ratio being specifically pre-determined for the at least one second temporary temperature probe introduced inside the chamber of the roasting apparatus to be calibrated or for the temporary calibration chamber replacing the chamber of the roasting apparatus to be calibrated, or is equal to 1 by default, $K_{2probe}$ and corresponds to a preset temperature ratio, said preset temperature ratio being specifically pre-determined for the at least one second temporary temperature probe introduced inside the chamber of the roasting apparatus to be calibrated or for the temporary calibration chamber replacing the chamber of the roasting apparatus to be calibrated, or is equal to 0 by default, In the process of adjustment of the temperature, in step c), during the reproduction of the preset curve $R_{set}$, the value of $T_{probe}$ and/or the value of $K_{1probe}$ and/or the value of $K_{2probe}$ can vary with time and/or temperature.

It has been observed that the difference of measure between two temperature probes is amplified at higher temperatures. Accordingly, the value of the coefficients $T_{probe}$, $K_{1probe}$ and $K_{2probe}$ can change during the reproduction of the preset curve Rset of step c) as temperature changes.

The above preferred mode uses an adjustment of the temperature based on a polynomial, yet other types of adjustment can be applied.

In one particular mode of the above embodiment of the calibration process:
step d) happens simultaneously to step c), and
in step c), during the reproduction of the preset curve $R_{set}$, at predefined times $t_{ref\ i}$, the corresponding ratio $T_{ref@tref\ i}/T_{cal@tref\ i}$ is calculated and a correction is immediately applied:
either to the temperatures $T_{set}$ provided by the roasting curves to be reproduced, said correction being a multiplication factor Ki defined as follows:

$$K_i = K_0 \prod_{n=1}^{i} \frac{T_{ref@trefn}}{T_{cal@trefn}}$$

wherein $K_0$ is preset, or is equal to 1 by default,
or
to the temperature $T_{reg}$ measured by the first temperature probe (5), said correction being a multiplication factor $$\frac{1}{Ki},$$

in step e), based on the last defined ratio Ki in step c), the roasting apparatus (X) is calibrated by applying:

said factor Ki of correction to the temperatures $T_{@ti}$ provided by the roasting curves to be reproduced by the roasting apparatus (X) or
said factor $$\frac{1}{Ki}$$

to the temperature $T_{reg}$ measured by the first temperature probe.

The factor $K_0$ can correspond to:
a preset factor specifically pre-determined for a series of similar manufactured apparatuses, or
a preset factor pre-determined for specific ambient conditions, or
a combination of said two preset factors.

$K_0$ usually corresponds to a preset factor specifically pre-determined for a series of similar manufactured apparatuses.

Actually, the roasting apparatus to be calibrated is usually part of a series of similar manufactured apparatuses. This series of similar manufactured apparatuses can be apparatuses comprising the same elements assembled in the same way, corresponding for example to a particular model or design of apparatus or even to the same batch of production.

If a first apparatus of the series has already been calibrated and its multiplication factor correction Ki pre-determined, then said correction or a rounded off value of said correction can be immediately applied in the calibration process of the other apparatuses of the series as the preset factor $K_0$. The advantage is that the method of calibration becomes shorter.

If this preset factor $K_0$ is not known, for example further to the manufacturing of a new type of roasting apparatuses or due to the use of new devices in manufacturing (new air flow driver, new heater), then $K_0$ is set to 1.

Alternatively, $K_0$ can correspond to a preset factor defined in relation with ambient conditions such as temperature or humidity outside the roasting apparatus (X). If during the calibration process, ambient conditions correspond to usual ambient conditions such as a temperature comprised between 20 and 25° C. and humidity of about 60%, then this factor can be set to 1. Based on preliminary calibration of the same apparatus in different ambient conditions, different values can be pre-determined for this factor in function of ambient conditions and stored in a look up table for further operations of calibration.

Lastly, $K_0$ can correspond to a combination, that is a multiplication, of the above preset factor specifically pre-determined for a series of apparatuses and the above preset factor defined in relation with ambient conditions.

As mentioned above, in the above particular mode, the value of the temperature $T_{cal@ti}$ measured at the at least one second temperature probe at step c) can be adjusted to an adjusted value $T_{cal@ti-adjusted}$ depending on the second temporary temperature probe or the temporary calibration chamber used during the process of calibration of the roasting apparatus.

In the above particular mode, in step c), if for successive $t_{ref\ i}$ the corresponding calculated ratios $T_{ref@tref\ i}/T_{cal@tref\ i}$ converge to one fixed value—for example $T_{ref@tref\ i}/T_{cal@tref\ i}$ differs by less than 2% from $T_{ref@tref\ i-1}/T_{cal@tref\ i-1}$—then step c) can be stopped and the last calculated factor of correction Ki can be used as the last defined ratio in step d).

Actually it means that the correction of the temperature in the regulation loop has already been reached and that continuing the operation will not provide a better correction.

In this particular mode, in step c), if for successive $t_{ref\,i}$ the corresponding calculated ratios $T_{ref@t_{ref\,i}}/T_{cal@tref\,i}$ do not converge to one fixed value—in particular differ strongly from the previous calculated ratio $T_{ref@t_{ref\,i-1}}/T_{cal@t_{ref\,i-1}}$ and the next calculated ratio $T_{ref@t_{ref\,i+1}}/T_{cal@t_{ref\,i+1}}$—then the calibration process can be stopped.

When the corresponding calculated ratios $T_{ref@t_{ref\,i}}/T_{cal@t_{ref\,i}}$ do not converge with time, for example oscillates, it means that no correction of the temperature in the regulation loop can be determined. The calibration process cannot be implemented.

In that case, the calibration process can be re-started to verify if it has been a temporary problem and the calibration process can be implemented successfully. If not, the default of calibration may reflect the fact that the roasting apparatus presents a defect, especially in the control of the heating device.

In this particular mode, the comparison of step d) is based on the ratio $T_{ref@tref\,i}/T_{cal@tref\,i}$, yet as mentioned above other types of comparison can be applied in other modes.

In a first implementation of the calibration process:
the preset curve $R_{set}$ can be a curve established with the master roasting apparatus (M) for the roasting of a specific type of coffee beans and a specific quantity of said coffee beans, and
before step b), coffee beans of said specific type and said specific quantity of coffee beans are introduced inside the chamber of the roasting apparatus (X) or in the temporary calibration chamber, and
in step b), the heating device is controlled to reproduce said preset curve $R_{set}$ while the chamber of the roasting apparatus comprises said coffee beans.

In an alternative to this first implementation of the calibration process:
the preset curve $R_{set}$ can be a curve established with the master roasting apparatus (M) for the roasting of a specific type of coffee beans and specific quantity of said coffee beans, and
before step b), coffee beans of said specific type and said specific quantity of coffee beans are introduced inside the chamber of the roasting apparatus (X) or in the temporary calibration chamber, and
in step b), the heating device is controlled to reproduce said preset curve $R_{set}$ while the chamber of the roasting apparatus comprises said coffee beans, and
in step d), the temperature $T_{cal@}t_i$ is compared with the temperature $T_{ref@}t_i$ and the ratio $K_{final}=T_{ref@}t_i/T_{cal@}t_i$ is calculated once at the final time $t_{final}$ of the curves $R_{ref}$ and $R_{cal}$,
in step e), a factor of correction corresponding to said calculated ratio is applied:
either to the temperatures $T_{set}$ provided by the roasting curves to be reproduced, said correction being a multiplication factor $K_{final}$
or
to the temperature $T_{reg}$ measured by the first temperature probe said correction being a multiplication factor
$$\frac{1}{K_{final}}.$$

Preferably, in this alternative to this first implementation, the steps a) to e) are reproduced at least one time.

In this first implementation of the process, coffee beans are introduced inside the chamber during the process.

In a variant of this first implementation,
the preset curve $R_{set}$ can be a curve established with the master roasting apparatus (M) for the roasting of granular inert objects, said granular inert objects being designed to simulate coffee beans, and
before step b), said granular inert objects are introduced inside the chamber of the roasting apparatus (X) or in the temporary calibration chamber, and
in step b), the heating device is controlled to reproduce said preset curve $R_{set}$ while the chamber of the roasting apparatus comprises said granular inert objects.

By inert, it is meant that these objects are of a nature that can withstand a temperature of at least 250° C. without physical or chemical reactions. In a preferred embodiment these granular inert objects are glass or plastic beads.

These objects present the advantage of not creating dirtiness inside the roasting chamber of the apparatus (X)

These granular inert objects are configured to create a pressure loss of the flow of hot air while the chamber is void of coffee beans and are designed to simulate coffee beans.

In a second implementation of the calibration process, no beans are introduced inside the chamber during the process.

In this second implementation, several advantages are obtained compared to the first implementation:
there is no need for an operator to weight and introduce specific type of beans inside the chamber resulting in elimination of the risk of human errors, saving time for the operator, avoiding the waste of beans used for the calibration process,
there is no need to reiterate the calibration process successively to approach the right correction, which requires time to let the roasting apparatus cool down between two calibration operations, which is time consuming.
the apparatus chamber remains proper.
the calibration process is not influenced by the properties of the specific beans used in the calibration process like variation from factory or from storage conditions of beans (variable temperature and humidity during storage).

In this second implementation of the calibration process:
the preset curve $R_{set}$ is a curve established with the chamber of the master roasting apparatus (M) while said chamber is void of beans,
in step b), the heating device is controlled to reproduce said preset curve $R_{set}$ while the chamber of the roasting apparatus (X) is void of beans.

In one mode of this second implementation, in step a), means configured to simulate the presence of coffee beans inside the chamber are introduced inside the chamber or are present inside the temporary calibration chamber.

This means configured to simulate the presence of coffee beans can be means configured to create a pressure loss of the flow of hot air while the chamber is void of coffee beans. Such means can be a device designed to restrict the flow of hot air inside the chamber such as a grid, a mesh, a plate with at least one hole and/or a pipe with a venturi design.

In a second alternative mode:
the heating device of the roasting apparatus comprises an air flow driver and a heater and the control system of the roasting apparatus is configured to control said air flow driver to change the flow of air, and
in step b) the air flow driver is controlled to create a pressure loss of the flow of hot air while the chamber is void of coffee beans in order to simulate the presence of coffee beans inside the chamber during a roasting operation.

Whatever the mode of this second implementation, the reference curve $R_{ref}$ determined with the master apparatus is established in the same conditions that are used for the calibration process of the roasting apparatus X, that means that during the determination of $R_{ref}$, the master apparatus presents the same means to simulate beans or uses the same calibration jug or controls the air flow driver to create the same pressure loss of the flow of hot air.

Whatever the mode of this second implementation, preferably, the preset curve $R_{set}$ provides a set of points ($T_{set@t_{set\ i}}$; $t_{set\ i}$) and comprises successively:

in a first phase: a plateau of the temperature $T_{set}$ at a fixed temperature $T_{set-stab}$, preferably of about 40° C., then
in a second phase: an increase of temperature $T_{set}$ from $T_{set-stab}$ to a higher temperature $T_{set-high}$, then
in a third phase: a plateau of the temperature $T_{set}$ at said temperature $T_{set-high}$.
optionally the reproduction of the second and third phases at a higher temperature than $T_{set-high}$.

In the first phase, the fixed temperature $T_{set-stab}$ is preferably defined as a temperature that can be easily reached by the roasting apparatus whatever the ambient temperature of the room where it is used. According to the place in the world (hot or cold geographical zone) and the type of shop (opened to the outside or in a room with conditioning air), a temperature $T_{set-stab}$ of about 40° C. can be defined as easily reachable by cooling for ambient temperatures higher than 40° C. and easily reachable by heating for ambient temperatures lower than 40° C.

In the second phase, the increase can depend on the type of heating device used in the roasting apparatus, and in particular on the type of regulation of the power provided to the heating device.

Preferably, the above preset curve comprises a final phase of cooling wherein heating is stopped until temperature decreases and reaches $T_{set-stab}$ back.

When the above preset curve with at least three phases is used in the calibration process, where:
step d) happens simultaneously to step c), and
in step c), during the reproduction of the preset curve $R_{set}$, at predefined times $t_{ref\ i}$, corresponding temperatures $T_{ref@t_{ref\ i}}$ and $T_{cal@t_{ref\ i}}$ are compared and immediately a correction is applied to the temperature $T_{reg}$ measured by the first temperate probe inside the control system of the roasting apparatus, or to the temperatures $T_{set@ti}$ provided by the preset curve $R_{set}$ to be reproduced inside the control system of the roasting apparatus,
and
in step e), based on the last correction in step c), the roasting apparatus is calibrated by applying said correction to the temperature $T_{reg}$ measured by the first temperate probe inside the control system of the roasting apparatus, or to the temperatures T@ti provided by the roasting curves to be reproduced inside the control system of the roasting apparatus,
then:
the at least one predefined time $t_{ref\ i}$ is defined in the parts of the curve $R_{set}$ comprising a plateau, preferably one predefined time $t_{ref\ i}$ is defined in the first phase and at least two predefined time $t_{ref\ i}$ are defined in the third phase and optionally at least two predefined time $t_{ref\ i}$ are defined in the reproduction of the second and third phases at a higher temperature than $T_{set-high}$.

When the above preset curve with at least three phases is used in the calibration process, where:
step d) happens simultaneously to step c), and
in step c), during the reproduction of the preset curve $R_{set}$, at predefined times $t_{ref\ i}$, the corresponding ratio $T_{ref@tref\ i}/T_{cal@tref\ i}$ is calculated and a correction is immediately applied:
either to the temperatures $T_{set}$ provided by the roasting curves to be reproduced, said correction being a multiplication factor Ki defined as follows:

$$K_i = K_0 \prod_{n=1}^{i} \frac{T_{ref@trefn}}{T_{cal@trefn}}$$

wherein $K_0$ is preset, or is equal to 1 by default,
or
to the temperature $T_{reg}$ measured by the first temperature probe, said correction being a multiplication factor $$\frac{1}{Ki},$$

in step e), based on the last defined ratio Ki in step c), the roasting apparatus (X) is calibrated by applying:
said factor Ki of correction to the temperatures $T_{@ti}$ provided by the roasting curves to be reproduced by the roasting apparatus (X) or
said factor $$\frac{1}{Ki}$$

to the temperature $T_{reg}$ measured by the first temperature probe.

then preferably, during step c):
if during the first phase, for successive $t_{ref\ i}$, the corresponding calculated ratios $T_{ref@t_{ref\ i}}/T_{cal@t_{ref\ i}}$ converge, for example $T_{ref@t_{ref\ i}}/T_{cal@t_{ref\ i}}$ differs by less than 2% from the previous calculated ratio $T_{ref@t_{ref\ i-1}}/T_{cal@t_{ref\ i-1}}$, then the first phase is shortened.

In that case, the second phase of the preset curve is applied earlier.

Similarly, preferably, during step c), if during the third phase, for successive $t_{ref\ i}$, the corresponding calculated ratios $T_{ref@t_{ref\ i}}/T_{cal@tref\ i}$ converge, for example $T_{ref@t_{ref\ i}}/T_{cal@t_{ref\ i}}$ differs by less than 2% from the previous calculated ratio $T_{ref@t_{ref\ i-1}}/T_{cal@t_{ref\ i-1}}$, then the third phase is shortened.

In that case and if the preset curve comprises at least one further phase, said further phases are applied earlier.

Similarly, preferably, during step c), if, in the third phase, for successive $t_{ref\ i}$, the corresponding calculated ratios $T_{ref@tref\ i}/T_{cal@tref\ i}$ do not converge to one fixed value, then the third phase is lengthened.

Whatever the implementation, the process of calibration can comprise a step of obtaining information relative to ambient conditions such as temperature and/or humidity outside the roasting apparatus and:

in step e) the correction can be modified based on said information. For example, the correction comprises an offset.

or the preset curve is modified by applying an offset to the temperature. For example, if this preset curve presents a plateau in the first phase, this plateau is offset.

Whatever the implementation, preferably in the process of calibration, after step c) where the preset curve $R_{set}$, is reproduced, the roasting apparatus is cooled down to a temperature of about 40° C.

This cooling step guarantees that the roasting apparatus is put back in a state enabling either the subsequent roasting operation or another calibration operation. This cooling is usually obtained by stopping heating but maintaining air flow inside the chamber.

Whatever the implementation, the calibration method can be implemented on demand, in particular for the first time after the manufacture of the roasting apparatus or after an operation of repairing or maintenance of said apparatus since these last operations can have a direct impact on the heating device and its relation to the chamber inside the apparatus or after the move or transport of the apparatus during which the apparatus may have suffered a shock.

The calibration process can be implemented automatically, for example at fixed time intervals or after a certain time of use. Some parts of the roasting apparatus like gaskets or seals may be damaged after a certain time of operation, particularly in hot roasting environment, which will directly affect the calibration of the apparatus. The flow of air can change to the presence of dirtiness too requiring maintenance and calibration.

The control system of the apparatus can be configured to display an alert at that time to urge the operator to operate the calibration process.

At the end of the operation of calibration, if calibration fails because a correction cannot be determined, the control system of the apparatus can be configured to display an alert to urge the operator to re-start the calibration process and/or to control the apparatus and eventually repair it.

If the apparatus comprises a communication interface for communication with a remote resource, an operator can display an alert if required.

Preferably, the apparatus comprises a user interface and the control system can be configured to make the calibration mode implementing the calibration process accessible via the user interface.

In the calibration mode, the control system can be configured to ask the operator to introduce the at least one second temperature probe inside the chamber or to replace the chamber by a calibration chamber, said calibration chamber comprising at least one second temperature probe. The user interface can display schemas to illustrate the operation of introducing the temporary second temperature probe or the temporary calibration chamber The method can be implemented directly in the control system of a roasting apparatus or on a computer or on a mobile device like a smartphone or a table app, these devices being connected to the roasting apparatus. Connection can be remote or wired.

Preferably, in the embodiment where the heating device of the roasting apparatus comprises an air flow driver and a heater, then, before implementing step a) of the calibration process, the air flow driver is calibrated.

The calibration comprises the step of adjusting the value of the air flow supplied in the roasting apparatus to the value of the air flow supplied in the master roasting apparatus.

In a second aspect, there is provided a coffee beans roasting apparatus comprising:

a chamber to contain coffee beans, a heating device to heat air supplied to the chamber, at least one first temperature probe to regulate the temperature supplied by the heating device, said first temperature probe being positioned outside the chamber, a control system configured to control the heating device and configured to reproduce roasting curves, each of said roasting curves providing a set of points ($T_{@ti}$; $t_i$) representing the temperature to be applied at discrete successive times $t_i$, respectively, said control of the heating device being based on the temperature $T_{reg}$ regulated by the first temperature probe, wherein said apparatus comprises means to introduce temporary at least one second temperature probe inside the chamber of the roasting apparatus or is configured to enable the temporary replacement of the chamber by a calibration chamber, said calibration chamber comprising at least one second temperature probe, and wherein the control system is configured to receive input of measured temperature by said at least one second temperature probe, and wherein the control system is operable to implement the calibration process such as described above.

Preferably, the chamber of the roasting apparatus is dismountable and is configured to be removed from the housing of the apparatus during the operation of introducing and removing the beans.

Generally, said chamber to contain coffee beans is devoid of any temperature probe.

In this apparatus, the at least one second temperature probe is present and operable inside the roasting chamber during a calibration mode of the apparatus only. During the normal roasting operation, this second probe is not positioned in the chamber.

The chamber is devoid of any temperature probe. There is no temperature probe positioned inside the chamber in order to measure temperature and use this measure as an input of the regulation feedback loop during the roasting operation.

Preferably, the apparatus comprises a user interface and the control system can be configured to make the calibration mode implementing the calibration process accessible via the user interface.

In the calibration mode, the control system can be configured to ask the operator to introduce the at least one second temperature probe inside the chamber or to replace the chamber by a calibration chamber, said calibration chamber comprising at least one second temperature probe. The user interface can display schemas to illustrate the operation of introducing the temporary second temperature probe or the temporary calibration chamber In one mode, the at least one second temperature probe is a device external to the coffee beans roasting apparatus and the coffee beans apparatus comprises an opening designed to introduce the at least one second temperature probe in an airtight manner inside the chamber or less preferably in the conduit connected to the outlet of the chamber.

In that mode, the at least one second temperature probe is not part of the roasting apparatus. It is a separate device.

The roasting apparatus comprise an opening to slide the at least one second temperature probe inside the chamber. Once introduced in the opening, the connection between the probe and the opening is airtight, for example by means of a tight elastic seal.

In another mode:
the chamber to contain coffee beans of the roasting apparatus is removable from the roasting apparatus, and
the coffee beans roasting apparatus comprises an area designed to receive and hold said removable chamber, and
the at least one second temperature probe is part of a calibration chamber, said calibration chamber being configured to be introduced temporary inside the holding and receiving area in place of the dedicated roasting chamber.

Accordingly, when it is required to position at least one second temperature probe inside the roasting chamber, the usual chamber dedicated to roasting is removed from the apparatus and replaced by the calibration chamber that holds the at least one second temperature probe.

In a third aspect, there is provided a computer program comprising instructions which, when executed by a computer, processor or control unit, cause the computer, processor or control unit to perform the calibration process such as described above.

Preferably the instructions of the computer program are executed by the processing unit of the roasting apparatus.

In one embodiment the instructions of the computer program can be executed by the processing unit of a device external to the coffee beans roasting apparatus, such as a mobile device.

In a fourth aspect, there is provided a computer readable storage medium comprising instructions which, when executed by a computer, processor or control unit cause the computer, processor or control unit to carry out the calibration process such as described above.

In the present description, the terms curve, profile or recipe can be equally used and define at least a set of discrete points ($T_{@ti}$; $t_i$) representing the temperature $T_{@ti}$ to be applied at discrete successive times $t_i$.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

Specific embodiments of the invention are now described further, by way of example, with reference to the following drawings in which.

DETAILED DESCRIPTION OF EXEMPLARY EMBODIMENTS

Roasting Apparatus

Figure 1:
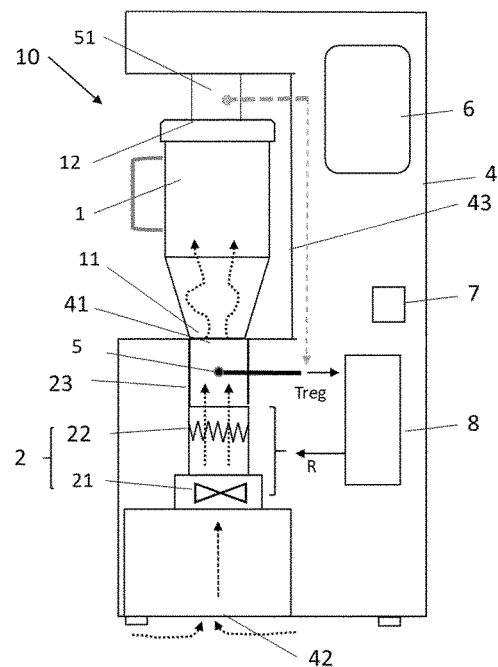
FIG. 1 is a schematic view of a roasting apparatus wherein the method of the present invention can be implemented.

FIG. 1 shows an illustrative side view part of a roasting apparatus 10. Functionally, the roasting apparatus 10 is operable to roast coffee beans hold in a chamber 1 by means of a flow of hot air introduced inside this chamber. At a first level, the apparatus comprises: a housing 4, a roasting unit and a control system 80. These components will now be sequentially described.

Roasting Unit of Roasting Apparatus

The roasting unit is operable to receive and roast coffee beans.

The roasting unit typically comprises at a second level of the roasting apparatus 10: a chamber 1 and a heating device 2, which are sequentially described.

The chamber 1 is configured to receive and hold the coffee beans introduced by the operator.

In the preferred embodiment, the chamber 1 is removable from the housing 4. The chamber can be put aside the roasting apparatus:
for the introduction or the removal of coffee beans, or
for cleaning and maintenance of the chamber once it is removed, or
for cleaning of the vertical housing part 43 behind the chamber.

The bottom opening 11 of the chamber is configured to enable air to pass through, specifically it can comprise a perforated plate on which the beans can lie and through which air can flow upwardly. The chamber 1 comprises a handle in order to enable the user to remove the chamber from the housing and hold it outside the housing.

A chaff collector (no illustrated) is in flow communication with the chamber 1 to receive chaffs that progressively separate from the beans and due to their light density are blown off to the chaff collector.

The heating device 2 comprises an air flow driver 21 and a heater 22.

The air flow driver 21 is operable to generate a flow of air (dotted lines arrows) in direction of the bottom 11 of the chamber. The generated flow is configured to heat the beans and to agitate and lift the beans. As a result, the beans are homogenously heated. Specifically, the air flow driver can be a fan powered by a motor. Air inlets 42 can be provided inside the base of the housing in order to feed air inside the housing, the air flow driver blowing this air upwardly though a passage 23 to an air outlet hole 41 in direction of the chamber 1 as illustrated by dotted lines arrows.

The heater 22 is operable to heat the flow of air generated by the air flow driver 21. In the specific illustrated embodiment, the heater is an electrical resistance positioned between the fan 21 and the bottom opening 11 of the chamber with the result that the flow of air is heated before it enters the chamber 1 to heat and to lift the beans. Other types of heater can be used such as an electrical resistor, a ceramic heater, a halogen source, a source of infrared and/or a source of microwaves.

The heater 22 and/or the air flow driver 21 is/are operable to apply a roasting profile to the beans, this roasting profile being defined as a curve of temperature against time.

When the chamber is mounted to the housing, the bottom of the chamber is tightly connected to the air outlet hole 41 to avoid that the flow of hot air flow leaks at the connection.

The top opening 12 of the chamber is connected to a smoke and particulates evacuation device (not illustrated).

Although the invention is described with a roaster implementing a fluidized bed of hot air, the invention is not limited to this specific type of roasting apparatus. Drum roasters and other kinds of roasters can be used.

The roasting apparatus comprises at least one first temperature probe 5 to regulate the temperature of air supplied by the heating device 2. This first temperature probe is positioned outside the chamber 1 inside the conduit 23 guiding hot air supplied by the heating device 2 to the bottom of the chamber 11, that is upstream the chamber.

In an alternative less preferred mode, at least one first temperature probe 51 to regulate the temperature of air supplied by the heating device 2 can be positioned downstream the chamber. This probe can become dirtied by the smoke during roasting operation.

In another alternative less preferred mode, the apparatus can comprise both first temperature probe 5, 51 to regulate the temperature of air supplied by the heating device 2. The average of the measured temperatures is used to regulate the heating device 2.

The roasting apparatus 10 usually comprises a user interface 6 enabling the display and the input of information.

The roasting apparatus can comprise a code reader 7 to read a code associated to a type of coffee beans, for example present on the package of coffee beans. Preferably, this code reader is positioned in the apparatus so that the operator is able to easily position a code in front of it. It is preferably positioned at the front face of the apparatus, for example close to a user interface 6 of the apparatus. Accordingly, information provided by the code can be immediately displayed through the display of the user interface 6 positioned aside.

Control System of Roasting Apparatus

Figure 2A:
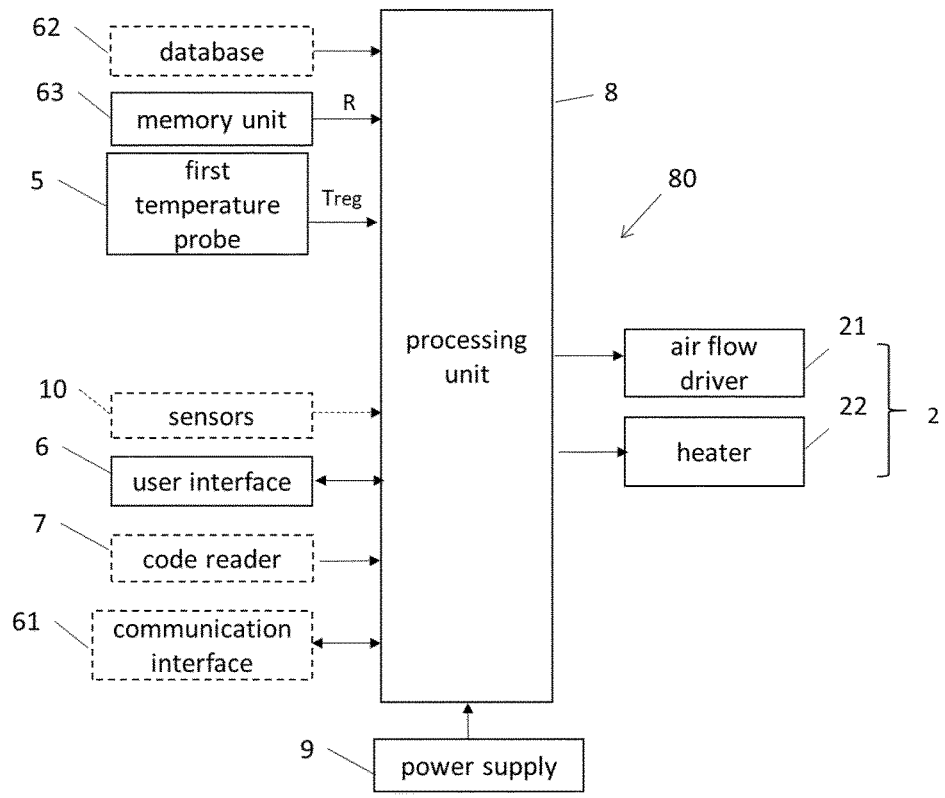
FIG. 2A shows a block diagram of a control system of the apparatus according to FIG. 1.
Figure 2B:
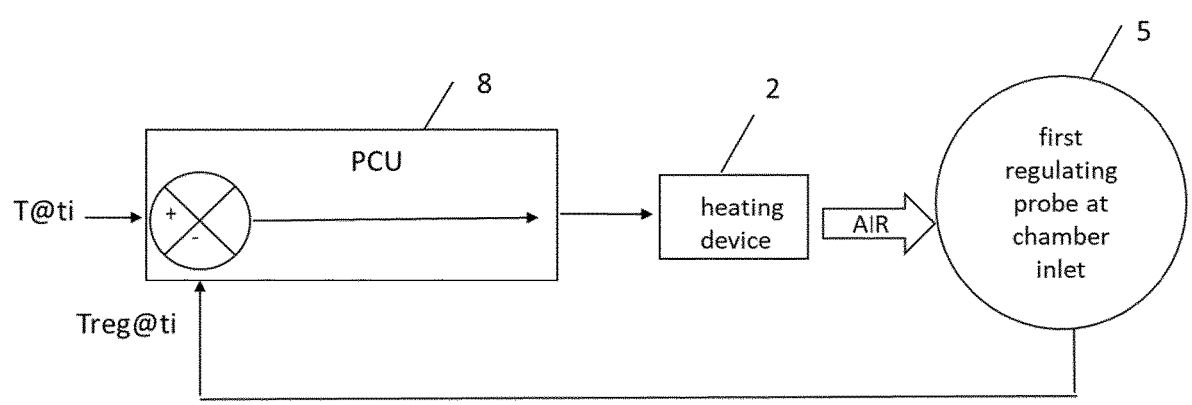
FIG. 2B illustrates the feedback loop of the temperature regulation.

With reference to FIGS. 1, 2A and 2B, the control system 80 will now be considered: the control system 80 is operable to control the components of the apparatus to roast coffee beans. The control system 80 typically comprises at a second level of roasting apparatus: the user interface 6, the processing unit 8, an outside temperature probe 5, a power supply 9, a memory unit 63, optionally a database 62, sensors 19, a communication interface 61 for remote connection, a code reader 7 or any combination of these devices.

The user interface 6 comprises hardware to enable a user to interface with the processing unit 8, by means of user interface signal. More particularly, the user interface receives commands from a user, the user interface signal transfers the said commands to the processing unit 8 as an input. The commands may, for example, be an instruction to execute a roasting process and/or to adjust an operational parameter of the roasting apparatus 10 and/or to power on or off the roasting apparatus 10. The processing unit 8 may also output feedback to the user interface 6 as part of the roasting process, e.g. to indicate the roasting process has been initiated or that a parameter associated with the process has been selected or to indicate the evolution of a parameter during the process or to create an alarm.

In addition, the user interface can be used to initiate a calibration mode of the roasting apparatus.

The hardware of the user interface may comprise any suitable device(s), for example, the hardware comprises one or more of the following: buttons, such as a joystick button, knob or press button, joystick, LEDs, graphic or character LDCs, graphical screen with touch sensing and/or screen edge buttons. The user interface 6 can be formed as one unit or a plurality of discrete units.

A part of the user interface can also be on a mobile app when the apparatus is provided with a communication interface 61 as described below. In that case at least a part of input and output can be transmitted to the mobile device through the communication interface 61.

The sensors 19 and the temperature probe 5 are operable to provide an input signal to the processing unit 8 for regulating of the roasting process and/or a status of the roasting apparatus. The input signal can be an analogue or digital signal. The sensors 19 typically comprise at least one temperature sensor 5 and optionally one or more of the following sensors: level sensor associated with the chamber 1, air flow rate sensor, position sensor associated with the chamber and/or the chaff collector.

A code reader 7 can be provided and operable to read a code, for example on coffee beans package, and automatically provide an input that is the identification of the type Cn coffee beans introduced in the chamber 1.

The processing unit 8 generally comprise memory, input and output system components arranged as an integrated circuit, typically as a microprocessor or a microcontroller. The processing unit 8 may comprise other suitable integrated circuits, such as: an ASIC, a programmable logic device such as a PAL, CPLD, FPGA, PSoC, a system on a chip (SoC), an analogue integrated circuit, such as a controller. For such devices, where appropriate, the aforementioned program code can be considered programmed logic or to additionally comprise programmed logic. The processing unit 8 may also comprise one or more of the aforementioned integrated circuits. An example of the later is several integrated circuits arranged in communication with each other in a modular fashion e.g.: a slave integrated circuit to control the user interface 6 in communication with a master integrated circuit to control the roasting apparatus 10.

The power supply 9 is operable to supply electrical energy to the said controlled components and the processing unit 8. The power supply 9 may comprise various means, such as a battery or a unit to receive and condition a main electrical supply. The power supply 9 may be operatively linked to part of the user interface 6 for powering on or off the roasting apparatus 10.

The processing unit 8 generally comprises a memory unit 63 for storage of instructions as program code and optionally data. To this end the memory unit typically comprises: a non-volatile memory e.g. EPROM, EEPROM or Flash for the storage of program code and operating parameters as instructions, volatile memory (RAM) for temporary data storage. The memory unit may comprise separate and/or integrated (e.g. on a die of the semiconductor) memory. For programmable logic devices the instructions can be stored as programmed logic. The instructions stored on the memory unit 63 can be idealised as comprising a coffee beans roasting program.

The control system 80 is operable to apply this coffee beans roasting program by controlling the heating device 2—that is, in the particular illustrated embodiment of FIG. 1, the air flow driver 21 and/or the heater 22—using signal of the outside temperature probe 5.

The coffee beans roasting program can effect control of the said components using extraction information encoded on the code and/or other information that may be stored as data on the memory unit 63 or from a remote source through the communication interface 61 and/or input provided via the user interface 6 and/or signal of the sensors 19.

In particular, the control system 80 is configured to apply a roasting curve R providing the temperature $T_{@t1}$, $T_{@t2}$, ... $T_{@final}$ to be applied at discrete successive times $t_1, t_2, \ldots, t_{final}$ respectively.

With that aim, the processing unit 8 is operable to:
receive an input $T_{reg@ti}$ of the outside temperature probe 5,
process the input according to roasting curve R,
provide an output, which is the roasting curve R. More specifically the output comprises the operation of at least the heater 22 and the air flow driver 21.

The temperature measured by the temperature probe 5 is used to adapt the power of the heater 22 and/or the power of the air driver 21 in a feedback loop in order to apply the roasting curve to the beans for example as illustrated in FIG. 2B.

In the illustrated feedback loop regulation, the temperature $T_{reg@ti}$ measured at the outside temperature probe 5 is compared to the temperature $T_{@ti}$ of the roasting cure to be reproduced. Depending on the difference, the heating device 2 is operated to compensate the difference.

Depending on the type of control applied in the roaster, the heater 22 can be powered at one pre-determined power, meaning its temperature is constant, and in that case the power of the air driver 21 can be controlled based on the temperature regulated at the probe 5 in order to vary the time of contact of the flow air through the heater during its movement.

Alternatively, the air driver 21 can be powered at one pre-determined power, meaning the flow rate of air is fixed, and in that case the power of the heater 22 can be controlled based on the temperature regulated at the probe 5 in order to heat more or less air during its passage through the heater.

In a last alternative, both heater 22 and air driver 21 can be controlled based on the regulation of the temperature by probe 5.

The control system 80 can comprise a communication interface 61 for data communication of the roasting apparatus 10 with another device and/or system, such as a server system, a mobile device and/or a physically separated measuring apparatus 3. The communication interface 61 can be used to supply and/or receive information related to the coffee beans roasting process, such as roasting process information, type of the beans, quantity of beans.

The communication interface 61 may comprise first and second communication interface for data communication with several devices at once or communication via different media.

The communication interface 61 can be configured for cabled media or wireless media or a combination thereof, e.g.: a wired connection, such as RS-232, USB, I2C, Ethernet define by IEEE 802.3, a wireless connection, such as wireless LAN (e.g. IEEE 802.11) or near field communication (NFC) or a cellular system such as GPRS or GSM. The communication interface 61 interfaces with the processing unit 8, by means of a communication interface signal. Generally the communication interface comprises a separate processing unit (examples of which are provided above) to control communication hardware (e.g. an antenna) to interface with the master processing unit 8. However, less complex configurations can be used e.g. a simple wired connection for serial communication directly with the processing unit 8.

The processing unit 8 enables access to different pre-defined roasting recipes ($R_{M_A}$, $R_{M_B}$, ... ), the recipes being adapted to the roasting of specific types of coffee beans or coffee blends ($C_A$, $C_B$, ... ) and preferably specific quantities ($M_A$, $M_B$, ... ) of said beans or blends.

These recipes can be stored in the memory 13 of the processing unit 8. Alternatively, these data can be stored in a remote server and the processing unit 8 can be supplied with access to this remote server through the communication interface 61, directly or indirectly through a mobile device establishing connection between the remote server and the processing unit.

The control system 80 can comprise a database 62 storing information about coffee beans, in particular about the operation conditions for roasting specific coffee beans as described hereunder. The database 62 can be stored locally in the memory 63 of the control system of the roasting apparatus or remotely in a server accessible through the communication interface 63.

In one alternative embodiment, the control system can be provided with the roasting recipes $R_{M_n}$ (and depending on the embodiment with their associated specific quantities $M_n$) during a code reading operation, these pieces of information being encoded inside the code and decoded by the control system.

The pre-defined roasting recipes ($R_{M_A}$, $R_{M_B}$, ... ) adapted to the roasting of specific types of coffee beans or coffee blends and specific weight of said beans are defined during an initial operation of roasting these specific beans inside a specific roasting apparatus defined as the master roasting apparatus (M). Usually, this operation is implemented by a coffee expert, who, based on his/her expertise in roasting, is able to define the parameters of temperature and time to optimally roast the specific beans and, as a result, to define the roasting recipe providing a set of points ($T_{@ti}$; $t_i$) representing the temperature $T_{@t1}$, $T_{@t2}$, ... to be applied at predefined corresponding successive times $t_1, t_2, \ldots$ respectively.

Once these roasting recipes are pre-defined with the master roasting apparatus, they can be reproduced automatically with roasting apparatus similar to the master roasting apparatus.

Logically, starting from the same beans and applying the same roasting recipes in roasting apparatuses similar to the master roasting apparatus, the same roasted coffee beans should be obtained. Yet, it has been observed that the reproduction of the roasting was not systematically consistent. Although the temperature probe 5 was perfectly calibrated to measure the correct temperature, non-consistency in the roasting of the same beans was observed between similar roasting apparatuses.

In the course of the present invention, it was suspected that small differences had appeared between each apparatus during manufacturing. These differences can relate to the use of different key components of the apparatuses (fan, heater, temperature sensor) further to changes in supply sources or to small differences in the assembly of each apparatus, for example creating very small air leakages at various places, or due to the small differences in the relative positions of the key elements one to the other.

As a result, although the flow of air introduced inside the chamber presented the right temperature as measured by the temperature probe 5, this flow of hot air was received differently inside the chamber with a direct impact on the roasting of the beans.

In order to solve this problem, a method has been developed to enable the calibration of any new manufactured roasting apparatus so that said apparatus can reproduce consistently the roasting recipes defined with the specific master roasting apparatus.

The method is illustrated in reference to FIGS. 3, 4 and 5A to 5C.

Figure 3:
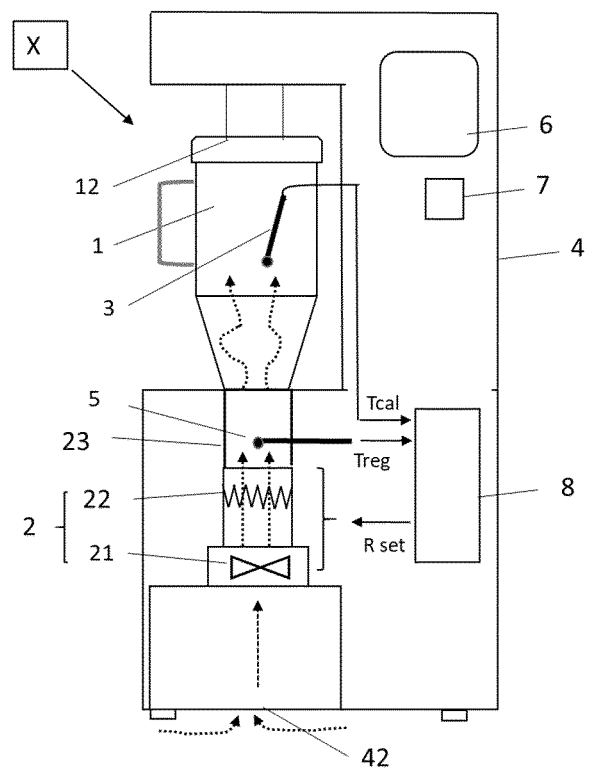
FIG. 3 illustrates the implementation of the calibration method in an apparatus according to FIG. 1.

FIG. 3 illustrates a roasting apparatus X similar to the roasting apparatus of FIG. 1 during the operation of calibration. The calibration aims at enabling the roasting apparatus X to reproduce coffee beans roasting recipes defined with one specific and similar master roasting apparatus M. During this calibration operation, a secondary temperature probe 5 is introduced inside the chamber 1 temporary.

By temporary, it is meant that this secondary temperature probe 5 is introduced during the calibration operation only or for other temporary operations (like maintenance check) but not during the normal operation of roasting the coffee beans.

Figure 4:
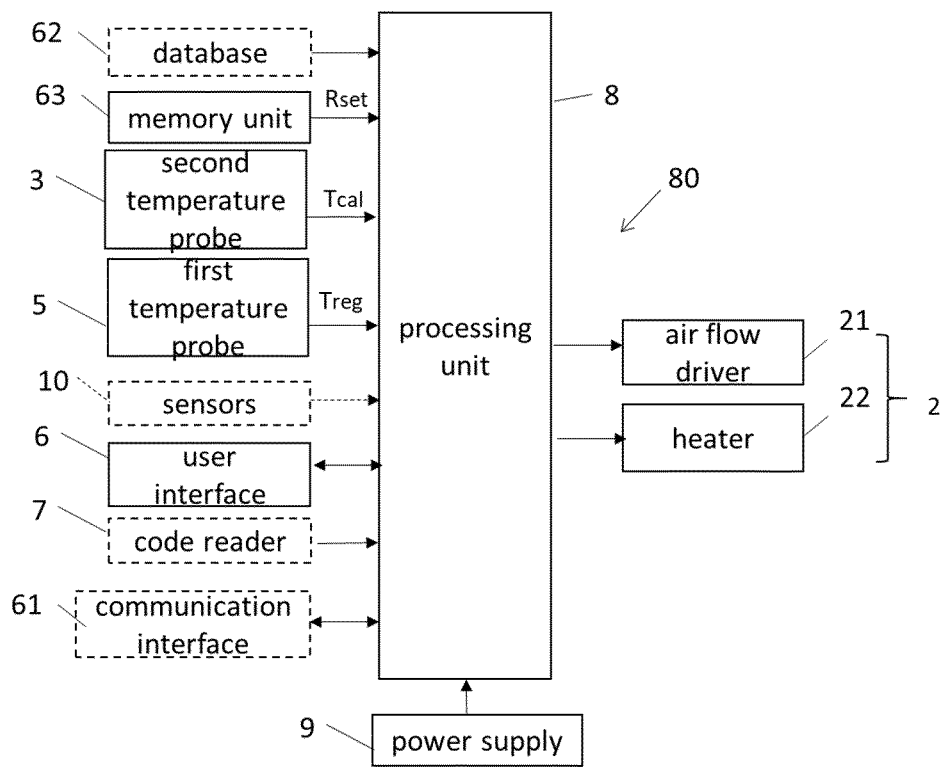
FIG. 4 shows the block diagram of the control system of the apparatus of FIG. 3 in order to enable the implementation of the method of calibration.

The secondary temperature probe 5 is connected to the processing unit 8 of the roasting apparatus so that the measure of the temperature inside the chamber $T_{cal}$ is provided as an input to the control system as illustrated in FIG. 4.

Figure 5A:
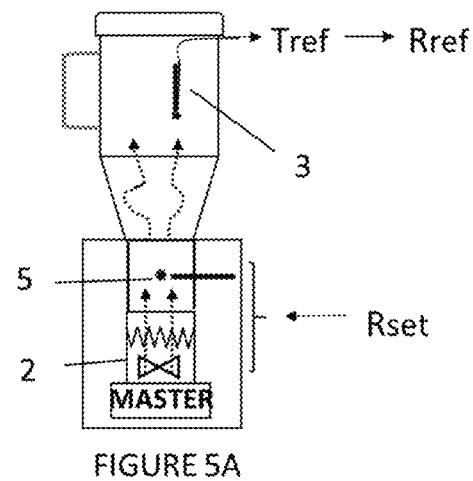
FIGS. 5A to 5D illustrates the implementation of the calibration method.

Before the calibration process of the apparatus X is initiated, in a preliminary stage, the pre-determined calibration curve $R_{ref}$ is established with the master roasting apparatus M as illustrated in FIG. 5A.

During this stage, the heating device 2 of the roasting apparatus M is controlled to reproduce a preset curve $R_{set}$, said preset curve providing a set of points ($T_{set@ti}$; ti) representing the temperature $T_{set@t1}$, $T_{set@t2}$, ... $T_{set@tfinal}$ to be applied at predefined corresponding successive times $t_1$, $t_2$, ..., $t_{final}$ respectively. This control is based on the temperature $T_{reg}$ regulated by the first temperature probe 5.

During the reproduction of the preset curve $R_{set}$, the temperature $T_{ref}$ in the chamber is measured in function of time at the temporary second temperature probe 3. This measure enables the determination of at least a set of points ($T_{ref@ti}$; $t_i$) illustrated in FIG. 5C by the curve $T_{ref}$, corresponding to the pre-determined calibration curve $R_{ref}$.

Figure 5B:
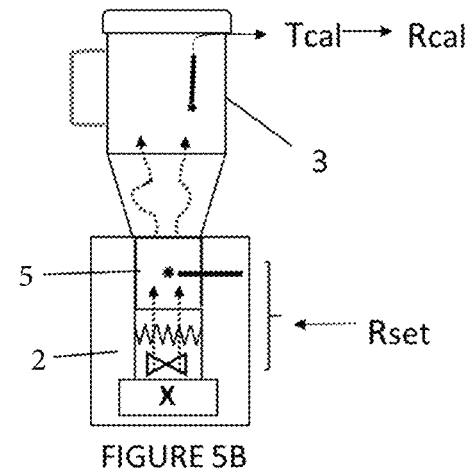

In the same manner, during the calibration process illustrated in FIG. 5B, the heating device 2 of the roasting apparatus X is controlled to reproduce the same preset curve $R_{set}$. This control is based on the temperature $T_{reg}$ regulated by the first temperature probe 5.

During the reproduction of the preset curve $R_{set}$, the temperature $T_{cal}$ in the chamber 1 is measured in function of time at the temporary second temperature probe 3. This measure enables the determination of at least a set of points ($T_{cal@ti}$; $t_i$) illustrated in FIG. 5C by the curve $T_{cal}$.

Figure 5C:
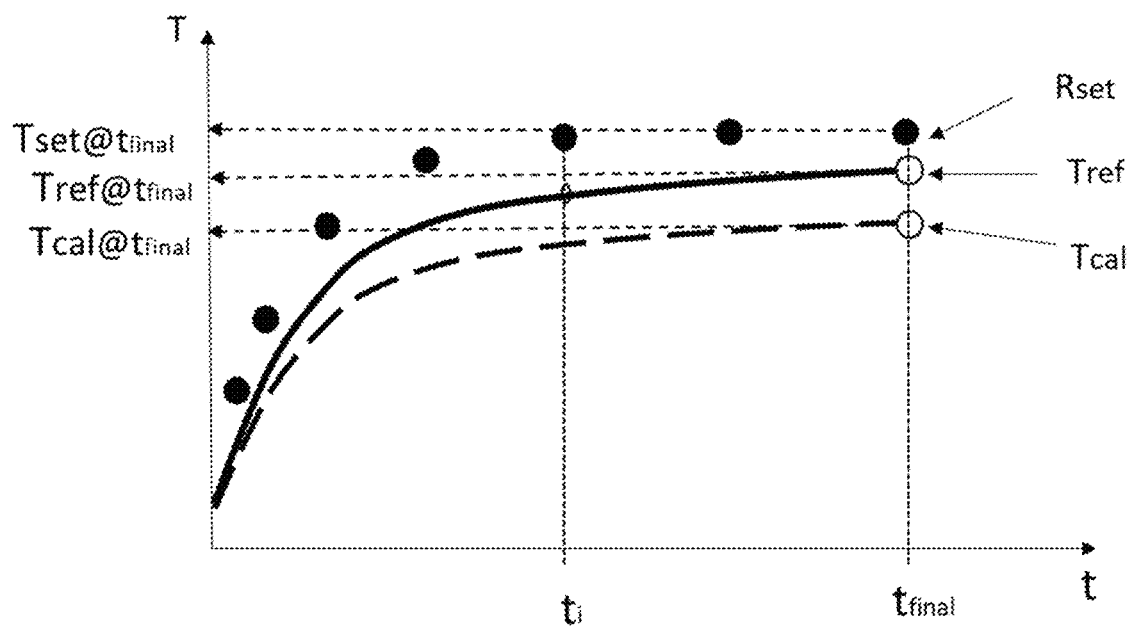

In the calibration process of the roasting apparatus X, the temperature $T_{cal@ti}$ is compared with the temperature $T_{ref@ti}$ obtained with the master roasting apparatus M at least one same time ti. FIG. 5C illustrates the curves or sets of points corresponding to:
- the preset curve Rset,
- the temperature $T_{ref@ti}$ in the chamber of the master roasting apparatus during the reproduction of the preset curve Rset, establishing the pre-determined calibration curve $R_{ref}$, and
- the temperature $T_{cal@ti}$ in the chamber of the roasting apparatus X during the reproduction of the same preset curve Rset.

FIG. 5C makes apparent how the reproduction of the same preset curve $R_{set}$ differs from one apparatus to another. This difference can be explained by differences in the manufacturing process.

Figure 5D:
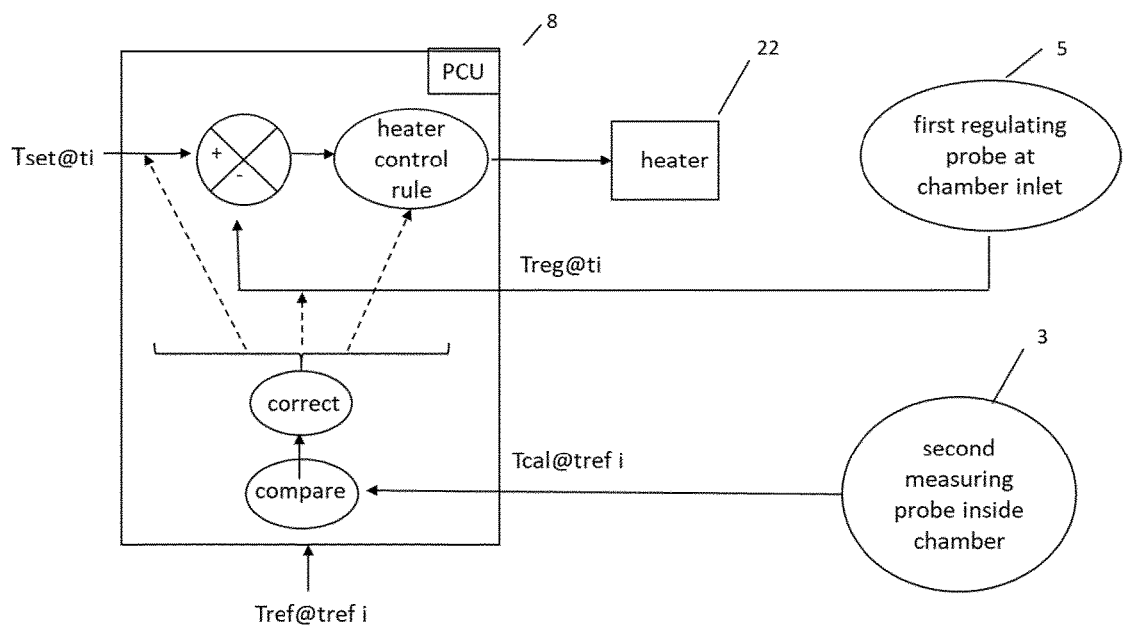

To finalise the calibration of the roasting apparatus X, based on the comparison between $T_{cal}$ and $T_{ref}$, a correction is applied in the feedback loop regulation of the apparatus X so that, when the control system of the apparatus X will reproduce the preset curve $R_{set}$, the desired temperature $T_{ref}$ is obtained inside the chamber of the apparatus X, as illustrated schematically in FIG. 5D.

Different types of correction can be applied depending on the relationship between $T_{cal}$ and $T_{ref}$. The complexity of the relationship can depend on: the differences of construction between the roasting apparatus and the master roasting apparatus such as the use of another type of heater, another shape of chamber, another control rule or algorithm to control the heater (e.g. more complex if there are 2 degrees of control on air flow driver and heater) providing for example a more sensitive control.

The relation is usually determined though regression analysis and implemented by means of a regression analysis software using well-known analysis models such as linear regression, multiple regression, non-linear regression, polynomial regression, . . . .

Once the relationship between $T_{cal}$ and $T_{ref}$ is defined, a correction can be applied to the rule or algorithm applied by the feedback loop regulation. The correction can be applied at different steps of this rule depending on the complexity of this rule. In the simplest embodiments, preferably the correction is applied to the temperature $T_{reg}$ measured by the first temperature probe 5 or to the temperatures $T_{@ti}$ provided by the roasting curves to be reproduced.

In the case of roasters M and X illustrated in FIGS. 5A and 5B, where both roasters comprise very similar components with a simple feedback loop control operating the heater 22 only based on the temperature measured by the temperature probe 5 a factor of correction can be defined through the ratio K at time $t_{final}$:

$$\frac{T_{cal@tfinal}}{T_{ch@tfinal}}$$

This ratio can be used as simple multiplication factor of the temperature $T_{@ti}$ provided by the roasting curves to be reproduced before being compared to $T_{reg}$ in the feedback loop regulation.

In another embodiment of the invention, the inverse of the above ratio, that is $$\frac{1}{K},$$

can be used as multiplication factor of the temperature $T_{reg}$ measured by the first temperature probe 5, before this temperature being compared to $T_{@ti}$ in the feedback loop regulation.

The correction enables the control system of the apparatus X to supply hot air inside the chamber at a temperature that is closer to the temperature $T_{ref}$ obtained in the master apparatus.

Accordingly, further to the calibration process, during roasting operation with the roasting apparatus X, predefined coffee beans roasting recipes R defined for specific beans with the master roasting apparatus M can be reproduced accurately by the control system applying the above ratio to the measure of the temperature regulated at the first probe 5 to control the heating device 5 or to the temperature $T_{@ti}$ provided by the roasting curves to be reproduced.

The calibration process can be applied with different alternatives relative to:
- the type of comparison between the temperatures $T_{ref}$ and $T_{cal}$, and/or
- the implementation of iteration in the calibration process reiterating the process with even more precise correction and/or
- the type of preset curve $R_{set}$ used in the process, and/or
- the presence of coffee beans inside the chamber or not during the calibration process.

These alternatives can provide more or less accuracy to the calibration and the further consistent reproduction of roasting recipes.

Figure 6:
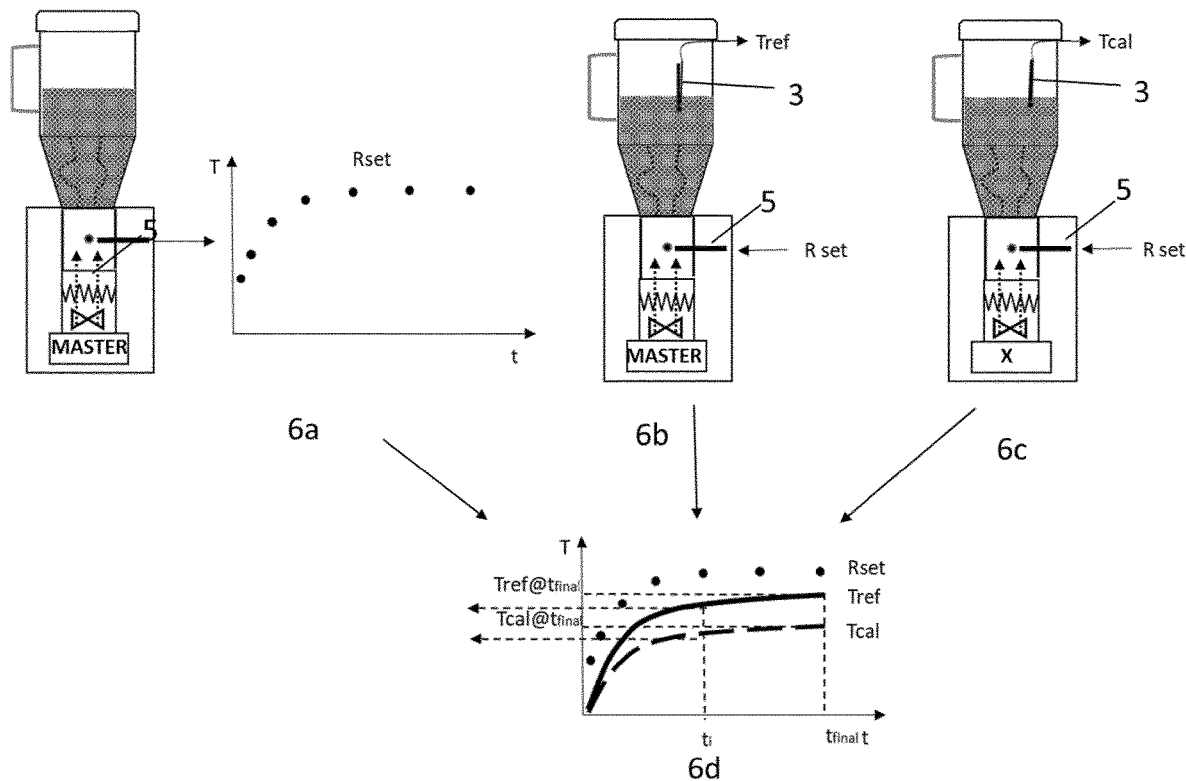
FIG. 6 illustrates an embodiment of the process of calibration wherein the preset curve $R_{set}$ corresponds to a roasting recipe defined for a specific type and weight of coffee beans.

FIG. 6 illustrates an embodiment of the process of calibration wherein the preset curve $R_{set}$ corresponds to a roasting recipe defined for a specific type and quantity of coffee beans. In this process:
- in a first preliminary stage 6a, the preset curve $R_{set}$ corresponding to a roasting recipe is created with the master roasting apparatus M roasting a specific type and quantity of coffee beans. This creation is usually the work of a coffee expert with the objective of providing the optimal taste to the roasted coffee beans, eventually in view of a specific type of extraction (espresso, filter, cold brew, . . . )
- in a further preliminary step 6b, these coffee beans of specific type and quantity are roasted again in the master roasting apparatus M by controlling the heating device in order to reproduce said curve $R_{set}$ based on the measure of temperature with the first temperature probe 5, and simultaneously the temperature $T_{ref}$ is measured in the chamber by a second temporary probe 3 introduced inside the chamber,
- then the process of calibration of apparatus X is implemented: these coffee beans of specific type and quantity are roasted in the roasting apparatus X to be calibrated by controlling the heating device in order to reproduce said curve $R_{set}$ based on the measure of temperature with the first temperature probe 5, and simultaneously the temperature $T_{cal}$ is measured in the chamber by a second temporary probe 3 (6c in FIG. 6).

In a further step, the temperature $T_{ref@ti}$ and $T_{cal@ti}$ measured in the respective chambers by the second temporary probe 3 are compared. In one preferred embodiment, the comparison comprises calculating the ratio $T_{ref@ti}/T_{cal@ti}$ at the final time $t_{final}$ of the curves $R_{ref}$ and $R_{cal}$ and applying this ratio as factor of correction to the temperature $T_{set}$ to be reproduced or applying the inverse of this ratio as factor of correction to the temperature $T_{reg}$ measured by the temperature probe 5 in the roasting apparatus X (6d in FIG. 6)

Preferably the step 6c is reproduced while applying this just determined factor of correction and a new more accurate factor of correction can be determined in the feedback loop regulation. The operation can be re-iterated again.

This embodiment can present some drawbacks:
- it requires the roasting of important quantities of coffee beans which are useless. This is a waste.
- it requires time for the operator to introduce beans and to implement the successive iterations. In particular, it is recommended to wait time between two roasting operations in order to let the roasting apparatus cool down and to be able to always repeat the roasting operation in the same conditions.
- the human operation can create errors (beans weighting for example) with direct impact on the calibration.
- the calibration depends on the properties of beans which can vary with time,
- the new apparatus requires cleaning before being sold.

To solve these drawbacks, the coffee beans can be replaced by granular inert objects like glass of beads.

Figure 7:
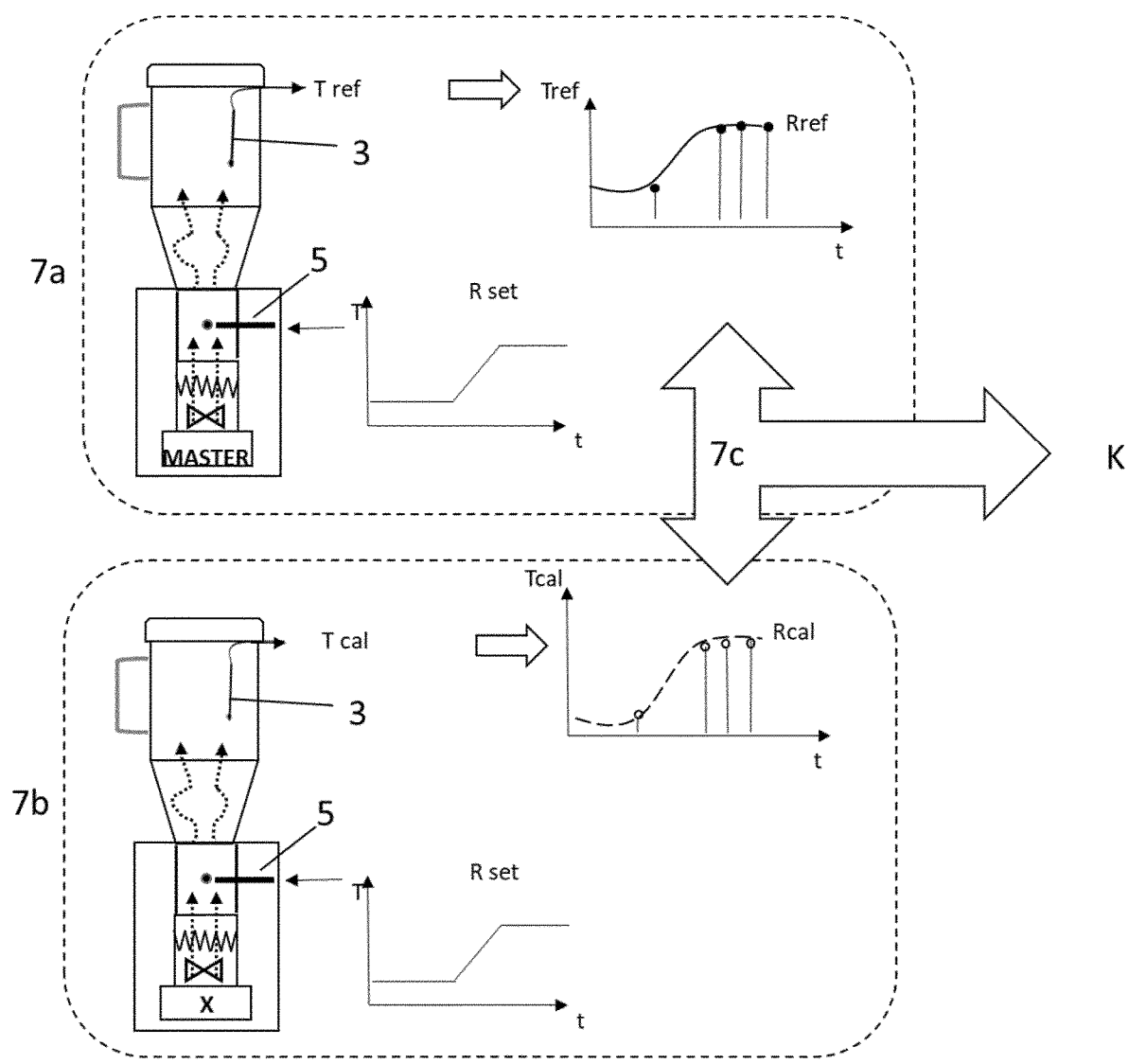
FIG. 7 illustrates an embodiment of the process of calibration wherein the calibration process is implemented without the need to use coffee beans.

FIG. 7 illustrates an embodiment of the process of calibration wherein the calibration process is implemented without the need to use coffee beans.

In this process, the preset curve $R_{set}$ is a curve established without relationship to any particular type or weight of coffee beans.

Similarly to the previous described embodiment:
- in a first preliminary stage 7a, a preset curve $R_{set}$ is reproduced in the master roasting apparatus M based on the regulation n of temperature with the first temperature probe 5, and simultaneously the temperature $T_{ref}$ is measured in the chamber by a second temporary probe 3 introduced inside the chamber. A calibration curve $R_{ref}$ or a set of points representing $T_{ref}$ in function of time is established.
- then the process of calibration of the roasting apparatus X is implemented:
  - the heating device of the apparatus X is controlled in order to reproduce said curve $R_{set}$ based on the regulation of temperature with the first temperature probe 5, and simultaneously the temperature $T_{cal}$ is measured in the chamber by a second temporary probe 3 introduced inside the chamber (7b in FIG. 7). A curve or a set of point $R_{cal}$ representing $T_{cal}$ in function of time is established.
  - in a further step or simultaneously, this temperature $T_{cal@ti}$ measured in the chambers by the second temporary probes 3 is compared to previously determined $T_{ref@ti}$ and a calibration correction K is deduced (7c in FIG. 7).

FIGS. 8A to 8D illustrate the curves that can be obtained in the embodiment illustrated in FIG. 7.

Figure 8A:
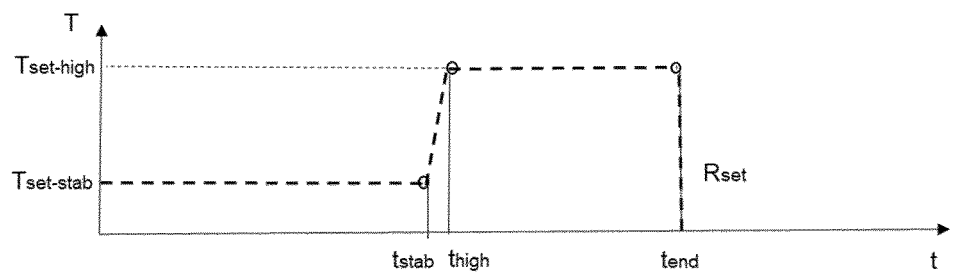
FIGS. 8A to 8D illustrate the curves that can be obtained in the embodiment illustrated in FIG. 7.

FIG. 8A illustrates the preferred profile of a preset curve $R_{set}$ that does not need to reproduce a profile corresponding to a roasting recipe. Preferably, this curve provides a set of points ($T_{set@tset\ i}$; $t_{set\ i}$) and comprises successively:
- in a first phase, a plateau of the temperature $T_{set}$ at a fixed temperature $T_{set\text{-}stab}$, then
- in a second phase, an increase of temperature $T_{set}$ from $T_{set\text{-}stab}$ to a higher temperature $T_{set\text{-}high}$, then
- in a third phase, a plateau of the temperature $T_{set}$ at said temperature $T_{set\text{-}high}$.
- in a fourth phase, a cooling during which heating is stopped.

Consequently, this preset curve $R_{set}$ can be defined with three points: ($T_{set\text{-}stab}$; $t_{stab}$), ($T_{set\text{-}high}$; $t_{high}$) and ($T_{set\text{-}high}$, $t_{end}$).

As mentioned earlier, in the first phase, the fixed temperature $T_{set\text{-}stab}$ is preferably defined as a temperature that can be rapidly reached by the roasting apparatus whatever the ambient temperature of the room where it is used, for example a temperature of about 40° C. The length of this first phase must be sufficient to enable the heating of cold apparatus or the cooling of hot apparatus (if it has been previously used) until a stabilisation state. The length can vary from one type of apparatus to another, in particular from the power of the heating device, the heat exchange with the outside.

Generally few minutes can be sufficient.

In the second and third phases, the temperature $T_{set-high}$ to be reached and maintained can depend again on the on the type of heating device used in the roasting apparatus, and in particular on the type of regulation of the power provided to the heating device. For an electric heating device where the air blower is kept at the same speed and where regulation is operated by adapting the power of the electrical resistance only, the temperature $T_{set-high}$ is preferably set in a stable operating zone of the electrical resistance. Accordingly, maintaining the electrical resistance in said zone does not create important deviations during the regulation.

The presence of a plateau in the third phase enables the stabilisation of temperature and a more reliable comparison with $R_{cal}$ along this plateau rather than in zone of fast change of temperature like in the increase at the beginning the second phase.

In a roasting apparatus such as illustrated in FIG. 1, the curve $R_{set}$ can be defined as follows:

$T_{set-stab}$=40° C.

$t_{stab}$ in the range of 7 to 10 minutes $T_{set-high}$ in the range of 100 to 200° C.

$t_{end}$ in the range of 4 to 6 minutes.

Figure 8B:
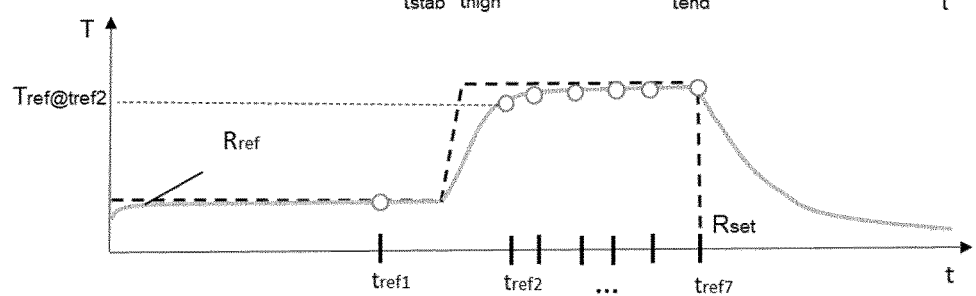

FIG. 8B illustrates the curve $R_{ref}$ obtained during the implementation of the first preliminary stage (such as illustrated in step 7a in FIG. 7) where the preset curve $R_{set}$ is reproduced in the master roasting apparatus M based on the temperature measured with the first temperature probe 5, and where simultaneously the temperature $T_{ref}$ is measured in the chamber by a second temporary probe 3 introduced inside the chamber. A calibration curve $R_{ref}$ comprising a set of points ($T_{ref@ti}$; $t_i$) representing $T_{ref}$ in function of time is determined as illustrated by white dots. Preferably, the points are determined at predefined times $t_{ref\,i}$ that are in the parts of the curve $R_{set}$ comprising a plateau.

As illustrated in FIG. 8B, at least one predefined time $t_{ref\,1}$ is defined in the first phase and at least two predefined time $t_{ref\,2}$ to $t_{ref\,7}$ are defined in the third phase.

Figure 8C:
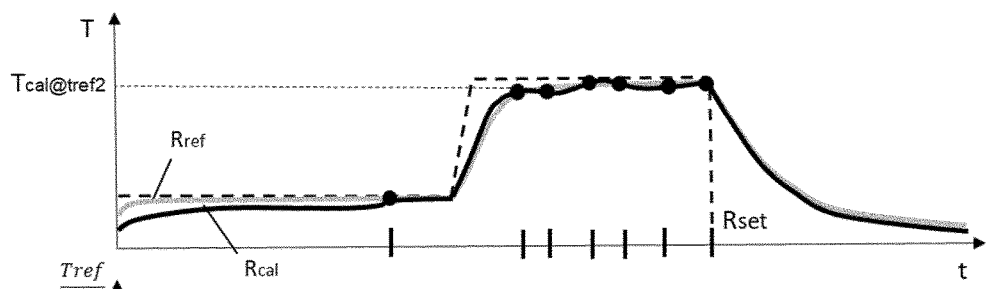

FIG. 8C illustrates the curve $R_{cal}$ obtained during the implementation of the calibration process of the roasting apparatus X where the heating device of the apparatus X is controlled in order to reproduce the curve $R_{set}$ based on the measure of temperature with the first temperature probe 5, and where simultaneously the temperature $T_{cal}$ is measured in the chamber by a second temporary probe 3 introduced inside the chamber (as illustrated in step 7b in FIG. 7). A curve $R_{cal}$ comprising a set of points ($T_{cal@ti}$; $t_i$) representing $T_{cal}$ in function of time is established as illustrated and $T_{cal}$ is measured at the predefined times $t_{ref\,i}$ establishing a set of points ($T_{cal@tref\,i}$; $t_{ref\,i}$) representing $T_{cal}$ in function of time as illustrated by black dots.

In the embodiment of FIG. 8C, during the reproduction of the preset curve $R_{set}$, at the predefined times $t_{ref\,i}$, the corresponding temperatures $T_{ref@tref\,i}$ and $T_{cal@tref\,i}$ can be compared and a correction is immediately applied inside the control system of the roasting apparatus.

In one preferred embodiment, illustrated by the curve in FIG. 8D, during the reproduction of the preset curve $R_{set}$ by the apparatus X, at predefined times $t_{ref\,i}$ (as determined in FIG. 8C), the corresponding ratio $T_{ref@tref\,i}/T_{cal@tref\,i}$ is calculated and a factor of correction is immediately applied to the temperatures $T_{set@ti}$ to be reproduced by the roasting apparatus X, said factor of correction corresponding to the ratio Ki defined as follows:

$$K_i = \prod_{n=1}^{i} \frac{T_{ref@trefn}}{T_{cal@trefn}}$$

Figure 8D:
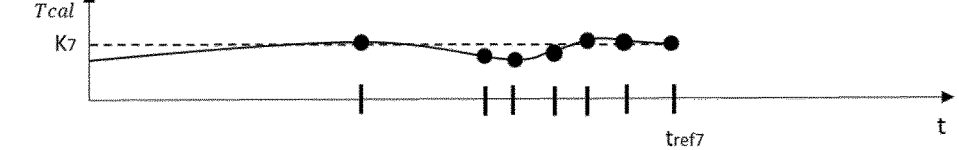

FIG. 8D illustrates the evolution of this ratio Ki at the different predefined times $t_{ref\,i}$. The immediate application of the correction in the control system after each calculated ratio enables the determination of a convergent value for this ratio in one single operation of calibration.

This final convergent value $K_7$ obtained at $t_{cal7}$ is used to calibrate the roasting apparatus by applying said multiplication factor to the temperatures $T_{@ti}$ of the roasting curves established with the master roasting apparatus M and to be reproduced by the roasting apparatus X.

Alternatively, the final convergent value $K_7$ obtained at $t_{cal7}$ can be used to calibrate the roasting apparatus by applying the multiplication factor $$\frac{1}{K7}$$

to the temperature $T_{reg}$ measured by the first temperate probe 5 inside the control system of the roasting apparatus X.

Depending on the evolution of the convergence of the calculated ratio K to a fixed value, the process of calibration can be stopped earlier.

Figure 9A:
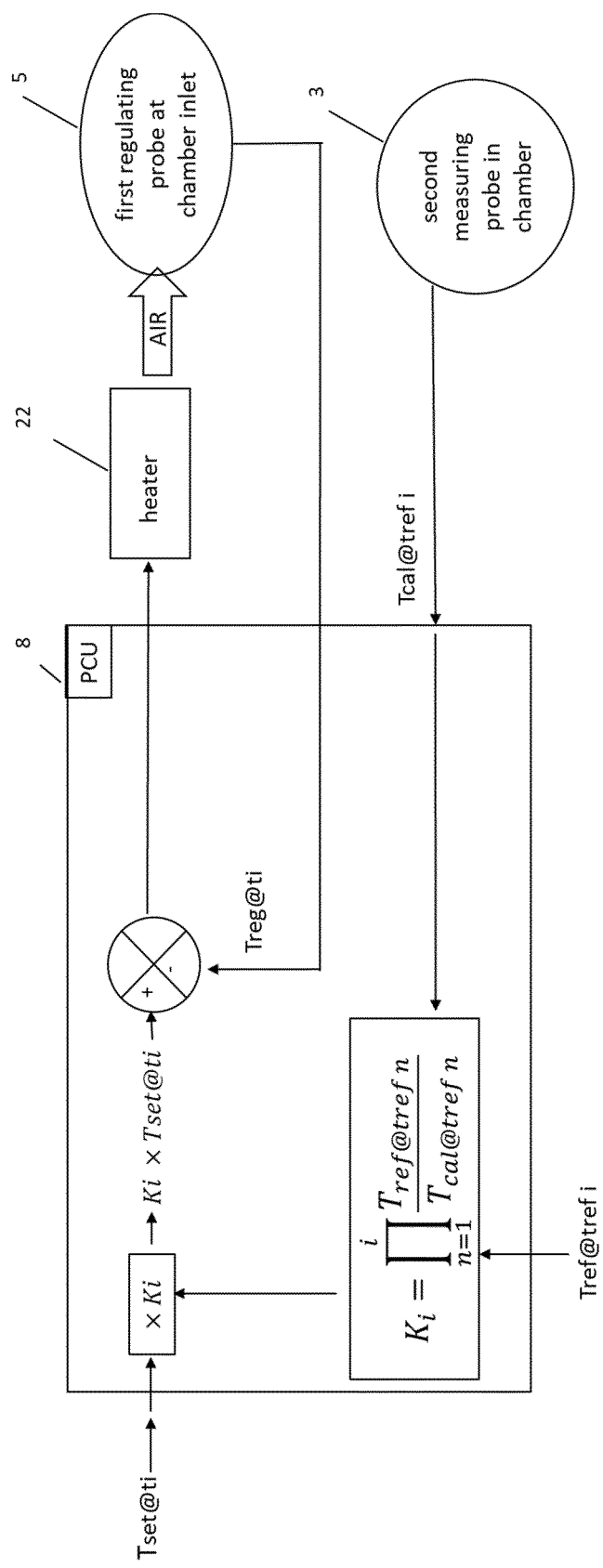
FIG. 9 illustrates the closed feedback loop of the temperature regulation during the process of calibration of FIG. 7 and FIGS. 8A to 8D, FIGS. 10A and 10B illustrate curves that are alternatives to the curve illustrated in FIG. 8D.

FIG. 9A illustrates the closed feedback loop of the temperature regulation during the process of calibration of FIG. 7 (steps 7b, 7c) and FIGS. 8A to 8D.

During the reproduction of the preset curve $R_{set}$, at the predefined times $t_{ref\,i}$ (i=1 to n), the temperature $T_{cal@tref\,i}$ is measured in the chamber at the second temperature probe 3 and is inputted in the control unit 8. It is compared to the corresponding predetermined temperature $T_{ref@tref\,i}$, here the comparison consists in calculating the ratio Ki as follows:

$$K_i = \prod_{n=1}^{i} \frac{T_{ref@trefn}}{T_{cal@trefn}}$$

Then, this ratio Ki is immediately used to correct the temperature $T_{set}$ inside the feedback loop of the temperature regulation: accordingly, in the illustrated example the inputted value $T_{set@ti}$ is inputted as $Ki \times T_{set@ti}$ when compared to $T_{reg@ti}$ in the feedback loop.

Figure 9B:
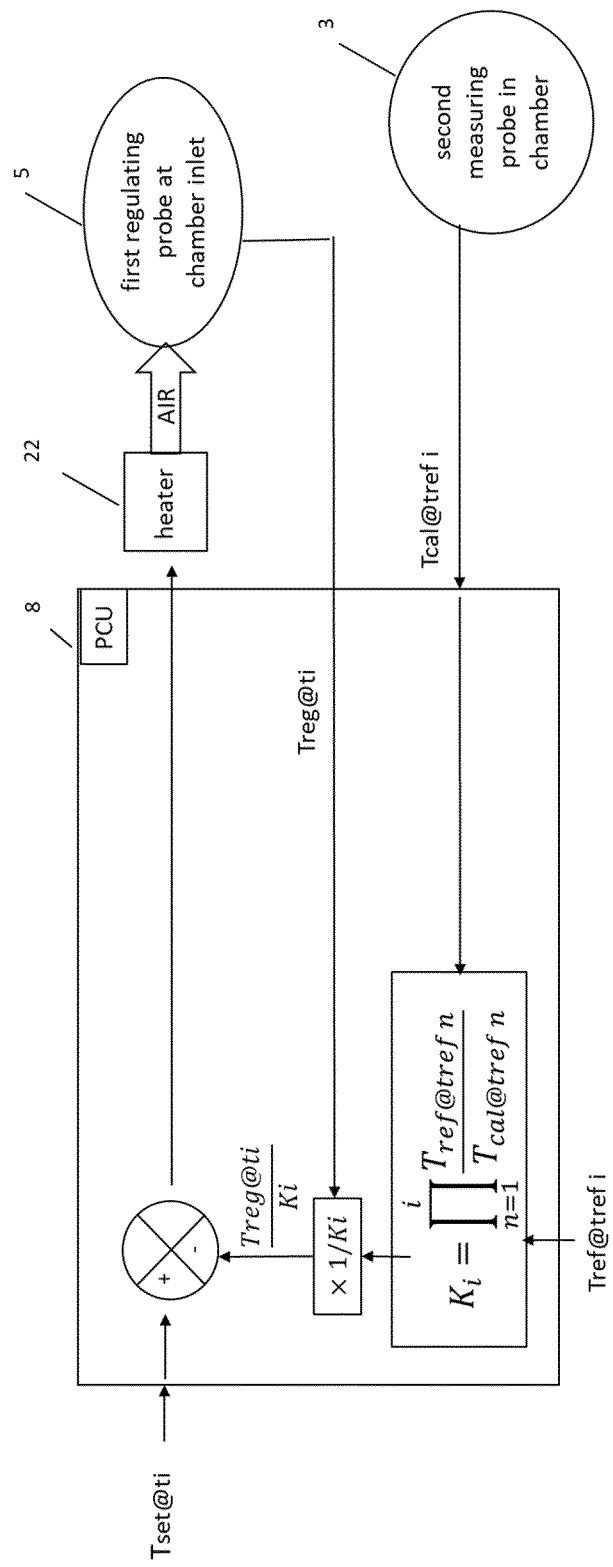

FIG. 9B illustrates an alternative method of calibration to the one implemented in FIG. 9A.

FIG. 9B illustrates the closed feedback loop of the temperature regulation during the process of calibration of FIG. 7 (steps 7b, 7c) and FIGS. 8A to 8D.

During the reproduction of the preset curve $R_{set}$, at the predefined times $t_{ref\,i}$ (i=1 to n), the temperature $T_{cal@tref\,i}$ is measured in the chamber at the second temperature probe 3 and is inputted in the control unit 8. It is compared to the corresponding predetermined temperature $T_{ref@tref\,i}$, here the comparison consists in calculating the ratio Ki as follows:

$$K_i = \prod_{n=1}^{i} \frac{T_{ref@trefn}}{T_{cal@trefn}}$$

Then, this ratio Ki is immediately used to correct the temperature $T_{reg}$ inside the feedback loop of the temperature regulation: accordingly, in the illustrated example the measured value $T_{reg@ti}$ is inputted as $$\frac{Treg@ti}{Ki}$$

when compared to $T_{set@ti}$ in the feedback loop.

In the process illustrated in FIG. 7 (steps 7b, 7c), 8A to 8D and 9A and 9B, if the apparatus X to be calibrated is part of a series of similar manufactured apparatuses for which calibration method has already been implemented, then a preset factor $K_0$ could be pre-determined for that series. Accordingly, in order to shorten the process of calibration of the apparatus X, this factor $K_0$ could be used in the calculation of the factor of correction illustrated in FIG. 8D as follows:

$$K_i = K_0 \prod_{n=1}^{i} \frac{T_{ref@trefn}}{T_{cal@trefn}}$$

Figure 10A:
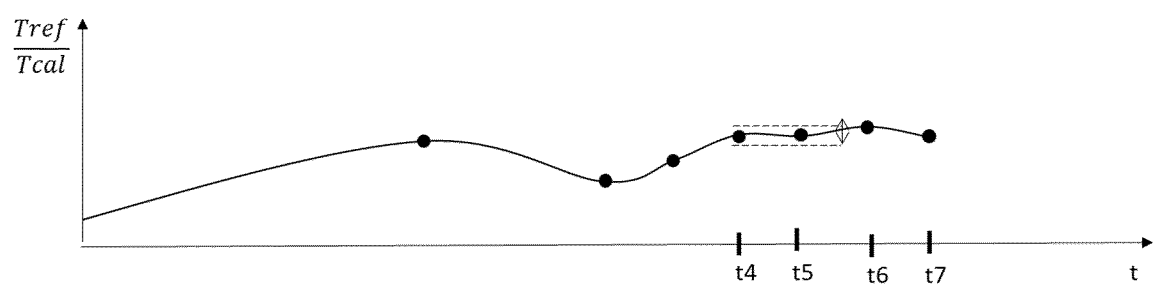
Figure 10B:
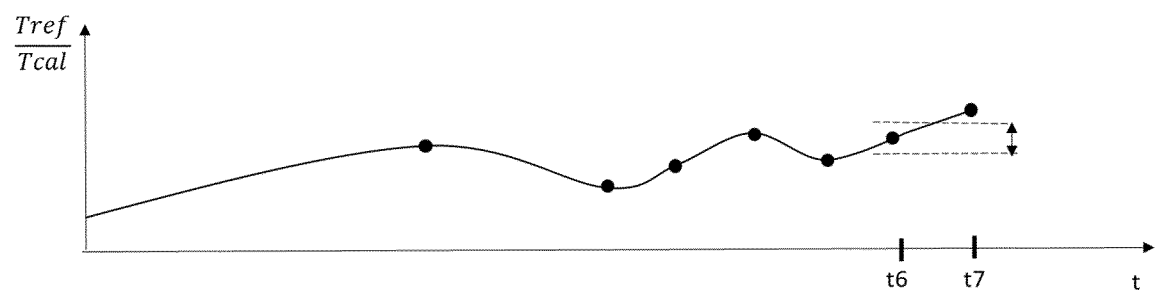

FIGS. 10A and 10B illustrate two different situations.

FIG. 10A illustrates the situation where the successive calculated ratios $T_{ref@tref\ i}/T_{cal@tref\ i}$ become closer one to the other with time. It can be set that, if at one $t_{ref\ i}$, the corresponding calculated ratio $T_{ref@tref\ i}/T_{cal@tref\ i}$ differs by less than 2% from the previous calculated ratio $T_{ref@tref\ i-1}/T_{cal@tref\ i-1}$, then the reproduction of the preset curve $R_{set}$ as illustrated in FIG. 8C can be stopped. The last calculated ratio Ki can be used as the factor of correction of the apparatus X. In the illustrated curve, the ratio $T_{ref@tref\ 5}/T_{cal@tref\ 5}$ is very close to $T_{ref@tref\ 4}/T_{cal@tref\ 4}$, meaning that the step c) of the calibration process can be stopped at $t_{cal5}$ already. FIG. 10B illustrates the situation where the successive calculated ratio $T_{ref@tref\ i}/T_{cal@tref\ i}$ do not converge. It can be set that, if at successive $t_{ref\ i}$, the corresponding calculated ratio $T_{ref@tref\ i}/T_{cal@tref\ i}$ increases by more than 20%, then the calibration process is stopped. In the illustrated curve, the ratio $T_{ref@tref\ i}/T_{cal@tref\ i}$ does not converge after $t_6$ meaning that a factor K cannot be defined. The process of calibration is failing and must be stopped. Such a situation reveals that the method has not been operated correctly or the apparatus is broken or presents such a default that it cannot be operated normally and calibrated.

It can be suggested to re-start the calibration process. If the calibration process fails again, maintenance shall be required.

The operator can be guided to implement these different steps through the display of the apparatus in an automatic manner.

Alternatively, it can be estimated that the successive calculated ratios do not converge when the ratios reach pre-determined upper and lower values, such as for example inferior to 0.5 or superior to 2. If such ratios are monitored, then the process is stopped.

Preferably, in the embodiment where the calibration process is implemented with the apparatus void of beans, means configured to simulate the presence of coffee beans are introduced inside the chamber of the apparatus X or are present inside the temporary calibration chamber positioned inside the apparatus X during the calibration process.

In that case, the reference curve $R_{ref}$ determined with the master apparatus is established in the same conditions that will be used for the calibration process of the roasting apparatus X: a master apparatus presenting the same means to simulate beans or using the same calibration jug.

Alternatively, in the embodiment where the calibration process is implemented with the apparatus X void of beans, and where the control system of the roasting apparatus X is configured to control the heating device to control the flow of air supplied to the chamber, then in the step b) of the calibration process, the heating device is preferably controlled to reproduce the value of the flow of air generated in presence of coffee beans inside the chamber.

In that case, the reference curve $R_{set}$ determined with the master apparatus is established with the same conditions that are: a master apparatus presenting the same flow of hot air.

In the above described embodiments of the calibration process, the value of the temperature $T_{cal@ti}$ measured at the second temperature probe 3 can be adjusted to an adjusted value $T_{cal@ti\text{-}adjusted}$ that is specific to said second temperature probe.

This adjustment of the temperature is not necessary if there is only one single second temporary probe 3 to determine the pre-determined reference curve Rref obtained with the master roasting apparatus and to calibrate all the roasting apparatuses subsequently, as illustrated in the preliminary step 6b and the calibration step 6c of FIG. 6.

Yet, when multiple different second temporary probes 3 or temporary calibration chambers exist (which becomes necessary when an important number of roasting apparatuses are commercialised), the measures of these probes or chambers are compared to the measures of the original second temporary probe 3 or to another already calibrated second temporary probe 3. Based on this comparison, a new second temporary probe 3 can be used in a calibration process of a roasting apparatus such as described above.

Preferably, the value of the temperature $T_{cal@ti}$ measured at the new second temperature probe at step c) can be adjusted to an adjusted value $T_{cal@ti\text{-}adjusted}$, and in step d) this adjusted value $T_{cal@ti\text{-}adjusted}$ can be compared with the temperature $T_{ref@ti}$.

For the operation of comparison of the measures of new second temporary probe with the measures of the original second temporary probe 3 or to another already calibrated second temporary probe 3, a temperature versus time curve of reference is reproduced, for example a curve such as illustrated in FIG. 8A. Then, based on this comparison, the adjustment of the measure of temperature of the new second temporary probe can be defined.

Different types of adjustment can be applied depending on the relationship between the temperatures of the two probes. The complexity of the relationship can depend on: the differences of construction between them such as the use of a new type of probe, another shape of chamber, a new position of the probe inside the temporary chamber, . . . .

The relation can be determined though regression analysis and implemented by means of a regression analysis software using well-known analysis models such as linear regression, multiple regression, non-linear regression, polynomial regression, . . . .

In one preferred process:

$$T_{cal@ti-adjusted} = K_{2probe} \cdot (T_{cal@ti})^2 + K_{1probe} \cdot T_{cal@ti} + T_{probe}$$

wherein the preset temperature offset $T_{probe}$ and the preset temperature ratios $K_{1probe}$ and $K_{2probe}$ are defined by regression analysis software.

The calibration process of the present invention was implemented on a model of roasting apparatuses presenting the features of the apparatus of FIG. 1.

A series of roasting apparatuses was produced as copies of the master roasting apparatus with which roasting recipes were established. Without applying the calibration process to the roasting apparatuses of the series similar to the master roasting apparatus, it was observed that the roasting of same beans according to the same roasting recipe produced roasted beans of different colours from one apparatus to another which was the evidence of absence of consistent roasting. The measure of the temperature inside the chambers of these different apparatus showed a difference of about 10% with the master apparatus, that is a difference of 20 to 25° C. when a temperature of 200° C. was requested.

By implementing the calibration method in each roasting apparatuses of the series, this difference was reduced to about 1° C. and it was confirmed that beans of same colour were obtained.

The calibration process of the present invention presents the advantages of:
- enabling the consistent reproduction of coffee beans recipes defined by an expert on a master roasting apparatus with any similar and new manufactured roasting apparatus,
- enabling automatic implementation.
- in some embodiments, avoiding the waste of coffee and operator's time, and not necessitating any cleaning operation, Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS roasting apparatus 10
chamber 1
  bottom opening 11
  top opening 12
heating device 2
  air flow driver 21
  heater 22
  passage 23
second temperature probe 3
housing 4
  air outlet hole 41
  air inlets 42
  vertical housing part 43
first temperature probe 5, 51
user interface 6
code reader 7
processing unit 8
control system 80
power supply 9
sensor 19
communication interface 61
database 62
memory unit 63

The invention claimed is:

1. Calibration process of a coffee beans roasting apparatus, in order to reproduce coffee beans roasting recipes defined with one specific master roasting apparatus,
said coffee beans roasting apparatus comprising:
a chamber to contain coffee beans,
a heating device configured to supply hot air to the chamber,
at least one first temperature probe to measure the temperature of air supplied by the heating device, said first temperature probe being positioned outside the chamber,
a control system configured to control the heating device and configured to reproduce roasting curves, said roasting curves providing at least a set of points representing the temperature to be applied at discrete successive times ti, respectively, said control of the heating device implementing a feedback loop regulation based on the temperature Treg measured by the at least one first temperature probe,
said calibration process comprising the steps of:
a—introducing at least one second temporary temperature probe inside the chamber of the roasting apparatus to be calibrated or replacing said chamber by a temporary calibration chamber, said temporary calibration chamber comprising at least one second temperature probe,
b—controlling the heating device to reproduce a preset curve Rset, said preset curve providing a series of points representing the temperature Tset@t1, Tset@t2, . . . Tset@tfinal to be applied at preset corresponding successive times t1, t2, . . . , tfinal respectively, said control being based on the temperature Treg measured by the at least one first temperature probe,
c—during the reproduction of the preset curve Rset, measuring the temperature Tcal in function of time inside the chamber at the at least one second temperature probe enabling the determination of at least a set of points,
d—comparing the temperature Tcal@ti measured at least one time ti with the temperature Tref@ti at said same time ti of a pre-determined reference curve Rref obtained with the master roasting apparatus, said reference curve Rref representing the temperature Tref measured in the chamber of the specific master apparatus while controlling the heating device of the master apparatus to reproduce said preset curve Rset, and
e—based on this comparison, calibrating the roasting apparatus by applying a correction to the feedback loop regulation, preferably by applying a correction to the temperature Treg measured by the first temperature probe or by applying a correction to the temperatures T@ti provided by the roasting curves to be reproduced by the roasting apparatus.

2. Calibration process according to claim 1, wherein:
step d) happens simultaneously to step c), and
in step c), during the reproduction of the preset curve Rset, at predefined times tref i, corresponding temperatures Tref@tref i and Tcal@tref i are compared and a correction is immediately applied to the feedback loop regulation, preferably a correction is applied to the temperature Treg regulated by the first temperate probe or a correction is applied to the temperatures Tset@ti provided by the preset curve Rset, and in step e), based on the last correction in step c), the roasting apparatus is calibrated by applying said last correction to the feedback loop regulation, preferably by applying said last correction to the temperature Treg measured by the first temperature probe or by applying said last correction to the temperatures T@ti provided by the roasting curves to be reproduced by the roasting apparatus.

3. Calibration process according to claim 1, wherein between step c) and step d):

the value of the temperature Tcal@ti measured at the at least one second temperature probe at step c) is adjusted to an adjusted value Tcal@ti-adjusted, said adjusted value depending on the second temperature probe introduced inside the chamber of the roasting apparatus to be calibrated or on the temporary calibration chamber replacing the chamber of the roasting apparatus to be calibrated, and in step d) this adjusted value Tcal@ti-adjusted is compared with the temperature Tref@ti.

4. Calibration process according to claim 1, wherein:

$$T_{cal@ti\text{-}adjusted} = K_{2probe} \cdot (T_{cal@ti})^2 + K_{1probe} \cdot T_{cal@ti} + T_{probe}$$

wherein:

Tprobe corresponds to a preset temperature offset, said preset temperature offset being specifically pre-determined for the at least one second temporary temperature probe introduced inside the chamber of the roasting apparatus to be calibrated or for the temporary calibration chamber replacing the chamber of the roasting apparatus to be calibrated, or is equal to 0 by default, K1probe and corresponds to a preset temperature ratio, said preset temperature ratio being specifically pre-determined for the at least one second temporary temperature probe introduced inside the chamber of the roasting apparatus to be calibrated or for the temporary calibration chamber replacing the chamber of the roasting apparatus to be calibrated, or is equal to 1 by default, and K2probe and corresponds to a preset temperature ratio, said preset temperature ratio being specifically pre-determined for the at least one second temporary temperature probe introduced inside the chamber of the roasting apparatus to be calibrated or for the temporary calibration chamber replacing the chamber of the roasting apparatus to be calibrated, or is equal to 0 by default.

5. Calibration process according to claim 4, wherein, in step c), during the reproduction of the preset curve Rset, the value of Tprobe and/or the value of K1probe and/or the value of K2probe varies with time and/or temperature.

6. Calibration process according to claim 1, wherein:

step d) happens simultaneously to step c), and in step c), during the reproduction of the preset curve Rset, at predefined times tref i, the corresponding ratio Tref@tref i/Tcal@tref i is calculated and a correction is immediately applied:

either to the temperatures Tset provided by the roasting curves to be reproduced, said correction being a multiplication factor Ki defined as follows:

$$K_i = K_0 \prod_{n=1}^{i} \frac{T_{ref@trefn}}{T_{cal@trefn}}$$

wherein:

K0 is preset, or is equal to 1 by default, or to the temperature Treg measured by the first temperature probe, said correction being a multiplication factor $$\frac{1}{K},$$

in step e), based on the last defined ratio Ki in step c), the roasting apparatus is calibrated by applying:

said factor Ki of correction to the temperatures T@ti provided by the roasting curves to be reproduced by the roasting apparatus or said factor $$\frac{1}{K},$$

to the temperature Treg measured by the first temperature probe.

7. Calibration process according to claim 6, wherein, in step c), if for successive tref i the corresponding calculated ratios Tref@tref i/Tcal@tref i converge to one fixed value, then step c) is stopped and the last calculated factor of correction Ki is used as the last defined ratio in step d).

8. Calibration process according to claim 6, wherein, in step c), if for successive tref i the corresponding calculated ratios Tref@tref i/Tcal@tref i do not converge to one fixed value, then the calibration process is stopped.

9. Calibration process according to claim 1, wherein, K0 corresponds to:

a preset factor specifically pre-determined for a series of similar manufactured apparatuses, and a preset factor pre-determined for specific ambient conditions.

10. Calibration process according to claim 1, wherein:

the preset curve Rset is a curve established with the master roasting apparatus for the roasting of beans of a specific type of coffee beans and a specific quantity of said coffee beans, and before step b), coffee beans of said specific type and said specific quantity are introduced inside the chamber of the roasting apparatus or in the temporary calibration chamber, and in step b), the heating device is controlled to reproduce said preset curve Rset while the chamber of the roasting apparatus comprises said coffee beans.

11. Calibration process according to claim 1, wherein:

the preset curve Rset is a curve established with the master roasting apparatus for the roasting of beans of coffee of specific type of coffee beans and a specific quantity of said coffee beans, before step b), coffee beans of said specific type and said specific quantity are introduced inside the chamber of the roasting apparatus or in the temporary calibration chamber, in step b), the heating device is controlled to reproduce said preset curve Rset while the chamber of the roasting apparatus comprises said coffee beans, and in step d), the temperature Tcal@ti is compared with the temperature Tref@ti and the ratio Kfinal=Tref@tfinal/Tcal@tfinal is calculated at the final time tfinal of the curves Rref and Rcal, in step e), a factor of correction corresponding to said calculated ratio is applied:

either to the temperatures Tset provided by the roasting curves to be reproduced, said correction being a multiplication factor Kfinal or to the temperature Treg measured by the first temperature probe said correction being a multiplication factor $$\frac{1}{Kfinal}.$$

12. Calibration process according to claim 1, wherein:
the preset curve Rset is a curve established with the master roasting apparatus for the roasting of granular inert objects, said granular inert objects being designed to simulate coffee beans, and before step b), said granular inert objects are introduced inside the chamber of the roasting apparatus or in the temporary calibration chamber, and in step b), the heating device is controlled to reproduce said preset curve Rset while the chamber of the roasting apparatus comprises said granular inert objects.

13. Calibration process according to claim 1, wherein:
the preset curve Rset is a curve established with the chamber of the master roasting apparatus void of beans, and in step b), the heating device is controlled to reproduce said preset curve Rset while the chamber of the roasting apparatus is void of beans.

14. Calibration process according to claim 1, wherein the preset curve Rset, providing set of points comprises successively:

in a first phase, a plateau of the temperature Tset at a fixed temperature Tset-stab, preferably of about 40° C., then in a second phase, an increase of temperature Tset from Tset-stab to a higher temperature Tset-high, and then in a third phase, a plateau of the temperature Tset at said temperature Tset-high.

15. Calibration process according to claim 1, wherein after step c) where the preset curve Rset, is reproduced, the roasting apparatus is cooled down to a temperature of about 40° C.

16. Calibration process according to claim 1, wherein:
the coffee beans roasting apparatus comprising:
a chamber to contain coffee beans,
a heating device configured to supply hot air to the chamber,
at least one first temperature probe to measure the temperature of air supplied by the heating device, said first temperature probe being positioned outside the chamber,
a control system configured to control the heating device and configured to reproduce roasting curves, said roasting curves providing at least a set of points representing the temperature to be applied at discrete successive times ti, respectively, said control of the heating device implementing a feedback loop regulation based on the temperature Treg measured by the at least one first temperature probe, said calibration process comprising the steps of:

a—introducing at least one second temporary temperature probe inside the chamber of the roasting apparatus to be calibrated or replacing said chamber by a temporary calibration chamber, said temporary calibration chamber comprising at least one second temperature probe, b—controlling the heating device to reproduce a preset curve Rset, said preset curve providing a series of points representing the temperature Tset@t1, Tset@t2, . . . Tset@tfinal to be applied at preset corresponding successive times t1, t2, . . . , tfinal respectively, said control being based on the temperature Treg measured by the at least one first temperature probe, c—during the reproduction of the preset curve Rset, measuring the temperature Tcal in function of time inside the chamber at the at least one second temperature probe enabling the determination of at least a set of points, d—comparing the temperature Tcal@ti measured at least one time ti with the temperature Tref@ti at said same time ti of a pre-determined reference curve Rref obtained with the master roasting apparatus, said reference curve Rref representing the temperature Tref measured in the chamber of the specific master apparatus while controlling the heating device of the master apparatus to reproduce said preset curve Rset, and e—based on this comparison, calibrating the roasting apparatus by applying a correction to the feedback loop regulation, preferably by applying a correction to the temperature Treg measured by the first temperature probe or by applying a correction to the temperatures T@ti provided by the roasting curves to be reproduced by the roasting apparatus.

17. Coffee beans roasting apparatus comprising:
a chamber to contain coffee beans,
a heating device to heat air supplied to the chamber,
at least one first temperature probe to regulate the temperature supplied by the heating device, said first temperature probe being positioned outside the chamber,
a control system configured to control the heating device and configured to reproduce roasting curves, said roasting curves providing at least a set of points representing the temperature to be applied at discrete successive times ti, respectively, said control of the heating device implementing a feedback loop regulation based on the temperature Treg measured by the at least one first temperature probe, wherein said apparatus comprises means to introduce temporary at least one second temperature probe inside the chamber of the roasting apparatus or is configured to enable the temporary replacement of the chamber by a calibration chamber, said calibration chamber comprising at least one second temperature probe, and wherein the control system is configured to receive input of measured temperature by said second temperature probe.

* * * * *